(12) United States Patent
Kannan et al.

(10) Patent No.: US 12,348,146 B2
(45) Date of Patent: Jul. 1, 2025

(54) ISOLATED HIGH-VOLTAGE DC-DC CONVERTER HYSTERETIC BURST MODE NOISE IMMUNITY USING DYNAMIC HYSTERESIS

(71) Applicant: TEXAS INSTRUMENTS INCORPORATED, Dallas, TX (US)

(72) Inventors: Bharath Balaji Kannan, Merrimack, NH (US); Robert Martinez, Lucas, TX (US); Jose Antonio Vieira Formenti, Allen, TX (US); Michael Corry, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 171 days.

(21) Appl. No.: 18/160,374

(22) Filed: Jan. 27, 2023

(65) Prior Publication Data
US 2024/0258927 A1 Aug. 1, 2024

(51) Int. Cl.
| | | |
|---|---|---|
| *H02P 1/00* | (2006.01) | |
| *B60L 53/22* | (2019.01) | |
| *H02M 1/08* | (2006.01) | |
| *H02M 3/335* | (2006.01) | |
| *H02M 7/5387* | (2007.01) | |
| *H02P 27/06* | (2006.01) | |

(52) U.S. Cl.
CPC ............ *H02M 3/335* (2013.01); *B60L 53/22* (2019.02); *H02M 1/08* (2013.01); *H02M 7/5387* (2013.01); *H02P 27/06* (2013.01); *B60L 2210/10* (2013.01)

(58) Field of Classification Search
CPC ....... H02P 27/06; H02M 3/335; H02M 11/08; H02M 7/5387; B60L 53/22; B60L 2210/10
See application file for complete search history.

(56) References Cited

U.S. PATENT DOCUMENTS

| | | | |
|---|---|---|---|
| 11,804,784 B2* | 10/2023 | Fauni | H02M 3/33573 |
| 2019/0068071 A1* | 2/2019 | Jia | H02M 3/3376 |
| 2022/0311343 A1* | 9/2022 | Kong | H02M 1/0048 |

* cited by examiner

*Primary Examiner* — Karen Masih
(74) *Attorney, Agent, or Firm* — Charles F. Koch; Frank D. Cimino

(57) ABSTRACT

A DC-to-DC converter having primary- and secondary-side circuitry separated by an isolation barrier, with a transformer and a feedback lane across the barrier, uses a dynamic function current source in its secondary-side circuitry to dynamically adjust the hysteresis threshold only at the transformer burst turn-off edge to provide enhanced immunity to transformer switching noise. An output voltage of the converter (or signal based thereon) is compared to the threshold to provide an input to a timing pulse generator that closes a switch to couple the dynamic function current source into voltage threshold setting circuitry. The dynamic function current source can reduce the threshold to a level that avoids chattering in transformer burst turn-off feedback signal caused by the noise, for a duration that can be based on lane delay of the converter and to an amplitude that can be based on the expected maximum negative amplitude of the noise.

20 Claims, 14 Drawing Sheets

ISOLATED HIGH-VOLTAGE DC-DC CONVERTER HYSTERETIC BURST MODE NOISE IMMUNITY USING DYNAMIC HYSTERESIS

TECHNICAL FIELD

This description relates generally to energy transfer methods, and more particularly to isolated high-voltage DC-DC converter hysteretic burst mode noise immunity with dynamic hysteresis.

BACKGROUND

DC-to-DC converters can include an isolation barrier across which power can be transferred, separating primary and secondary sides, to provide electrical isolation between, e.g., a user and high-power circuitry, thus enhancing safety. For example, DC-to-DC converters can be used in automotive or industrial applications to supply power to one or more bias supplies, which in turn power one or more components. In this example, the DC-to-DC converters isolate the bias supplies, and the components they supply power to, from a power source.

DC-to-DC converters can be configured to transfer electrical energy from primary to secondary sides as bursts of energy packets. For example, a primary-side power stage of the converter can be switched at a switching frequency and can thus energize a transformer of the converter at the switching frequency over a burst period. The burst period can then be followed by a rest period during which the transformer is not energized. Regulation of a secondary-side output voltage of the converter is provided by an output capacitor that is charged by the secondary side of the transformer. The amount of power delivered into the transformer can be regulated using hysteretic control, also termed "bang-bang control." When the output capacitor voltage reaches an upper threshold, delivery of energy across the transformer ceases, initiating a rest period. A secondary-side load discharges the output capacitor voltage. When the output capacitor voltage drops below a lower threshold, delivery of energy across the transformer to the output capacitor is resumed with another burst period, thus recharging the output capacitor. This controlled burst-rest cycle repeats as secondary-side power is consumed by the load so that the load is consistently provided with sufficient power for operation.

A monolithic DC-to-DC converter integrates into a single chip (e.g., a single die or a single multi-chip module comprising multiple dies in a package) primary- and secondary-side power transfer circuitry, an isolation barrier, and a transformer to transfer electrical energy across the isolation barrier. As compared to converters that provide one or more of these components (e.g., the transformer) as separately fabricated discrete components that are assembled together, e.g., on a printed circuit board (PCB), monolithic converters enable reduction of PCB footprint area and bulk, reduction of device component count, and reduction of probability of converter failure. These advantages make monolithic converters desirable in automotive and industrial applications for which reliability and safety are prioritized.

SUMMARY

An example an integrated circuit package includes a DC-to-DC converter. The converter includes primary- and secondary-side circuitry separated by an isolation barrier, a transformer arranged across the barrier, and a feedback lane across the barrier. The secondary-side circuitry includes a first current source coupled to a resistor. A comparator in the secondary-side circuitry is coupled at a first input to an output voltage of the secondary-side circuitry, or a signal based on the output voltage, and at a second input to a dynamic reference voltage. The secondary-side circuitry provides a hysteresis control output coupled to an output of the comparator. The secondary-side circuitry further includes a second current source coupled to the resistor. The second current source is in series with a first switch coupled to and controlled by the comparator output. The secondary-side circuitry further includes a timing pulse generator coupled at an input to the hysteresis control output. The secondary-side circuitry further includes a dynamic function current source coupled to the resistor. The dynamic function current source is in series with a second switch coupled to and controlled by an output of the timing pulse generator.

An example method of dynamic hysteretic control of an isolated DC-to-DC converter includes setting a hysteretic voltage threshold in secondary-side circuitry of the converter to a first threshold value. An output voltage of the converter, or a voltage signal based on the output voltage, is compared to the hysteretic voltage threshold. Based on the comparison, it is determined that the output voltage or the signal based thereon has increased above the first threshold value. The output voltage or the signal based thereon has a maximum negative noise amplitude. Based on the determining the increase, the hysteretic voltage threshold is decreased by an amount that is based on the maximum negative noise amplitude to a second threshold value. Then, less rapidly than it was decreased, the hysteretic voltage threshold is increased to a third threshold value that is less than the first threshold value.

An example system includes a motor and a three-phase AC bridge coupled to the motor. The AC bridge includes six insulated-gate bipolar transistors (IGBTs), each having a gate. A respective gate driver is coupled to the gate of each respective IGBT. A respective isolated bias supply is coupled to each respective gate driver. Each isolated bias supply includes a DC-to-DC converter. The converter includes a comparator coupled at a first input to an output voltage of the converter, or a signal based on the output voltage, and at a second input to a dynamic reference voltage. The converter further includes a constant current source that is in series with a first switch coupled to and controlled by an output of the comparator. The converter further includes a timing pulse generator coupled at an input to the comparator output. The converter further includes a dynamic function current source in series with a second switch coupled to and controlled by an output of the timing pulse generator.

DETAILED DESCRIPTION

Use of an integrated transformer in a monolithic DC-to-DC converter may reduce the bulk associated with a discrete transformer. However, such an integrated transformer may have comparatively less magnetizing inductance (e.g., in the range of less than about 100 nanohenries) than a discrete transformer and may thus permit a comparatively reduced power range at the secondary side of the converter (the converter output). For example, whereas, in a DC-to-DC converter using a large discrete-component transformer, power may be able to be transferred at a switching frequency lower than about 10 megahertz (e.g., between about 100 kilohertz and about 500 kilohertz), in a monolithic DC-to-DC converter, the integrated transformer may need to be switched at much higher frequencies, e.g., in the range of between about 10 megahertz and about 50 megahertz. For applications consuming less than about 3 watts at the secondary-side output, power transfer via monolithic DC-to-DC converter with an integrated transformer is viable when operating at these higher switching frequencies.

Figure 1:
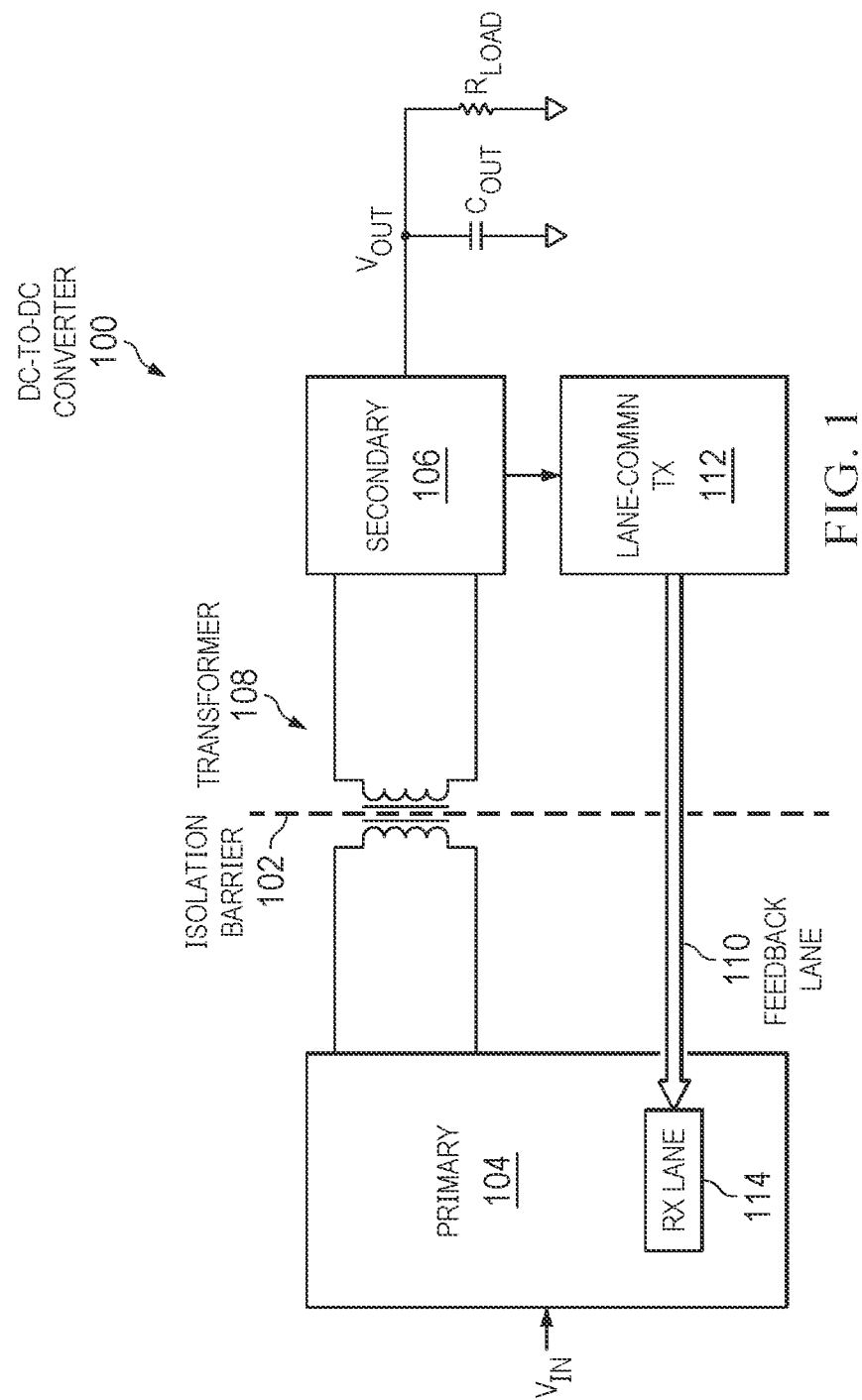
FIG. 1 is a schematic illustration of an example DC-to-DC converter and associated circuitry.

FIG. 1 shows an example DC-to-DC converter 100 that can, for example, be implemented as a monolithic DC-to-DC converter in an IC package. The monolithic DC-to-DC converter package can include other components and functionalities beyond those shown in FIG. 1 and described below. An isolation barrier 102 separates a higher-power primary side from a lower-power secondary side. As an example, primary-side input voltage $V_{IN}$ may be between about 21 volts and about 27 volts, and secondary-side output voltage $V_{OUT}$ may be between about 18 volts and about 25 volts. A secondary-side power load, which can be external to the monolithic package, is represented in the schematic of FIG. 1 as a resistance $R_{LOAD}$. Primary-side circuitry 104 in the DC-to-DC converter 100 can transfer energy in bursts across the isolation barrier 102 to secondary-side circuitry 106 via transformer (e.g., integrated transformer) 108 and thus to charge output capacitor $C_{OUT}$. In some examples, output capacitor $C_{OUT}$ is outside of and electrically coupled to the DC-to-DC converter 100. In other examples, output capacitor $C_{OUT}$ is included in the DC-to-DC converter 100, e.g., as part of secondary circuitry 106. Primary-side circuitry 104 may be signaled to commence or end an energy transfer burst over the transformer 108 by secondary-side circuitry 106 via a feedback lane 110 comprising a feedback channel that crosses the isolation barrier 102. For example, a lane communication transmitter 112 on the secondary side may be configured to encode a feedback signal to send over the feedback lane 110 to a feedback lane receiver 114 incorporated in or associated with the primary-side circuitry 104. As an example, the feedback lane 110 may use high-voltage capacitive isolation technology to transmit the feedback signal across the isolation barrier 102.

Whatever the form of the feedback lane 110, the feedback lane 110 will have associated with it an amount of information transfer latency (lane delay) $t_{DLY\_LANE}$ inclusive of a time between a first instant when information is sent from the secondary side and a second instant when the information is received from the primary side of the converter. This lane delay $t_{DLY\_LANE}$ translates into delayed activation and deactivation of the energy transfer bursts, resulting in excess voltage ripple at the secondary-side circuitry 106, potentially violating ripple requirements of the system application. High-frequency switching coupled with internal sensing of the output voltage $V_{OUT}$ after bond-wires (not shown) of the monolithic package introduces high-frequency noise on the sensed output voltage signal $V_{OUT}$. The noise induced by the high-frequency switching can be large enough to distort the hysteresis used in the hysteretic control. Any filtering added to this sensed signal can create additional delay (or latency) to burst activation and deactivation control signals, increasing the voltage ripple.

Figure 2:
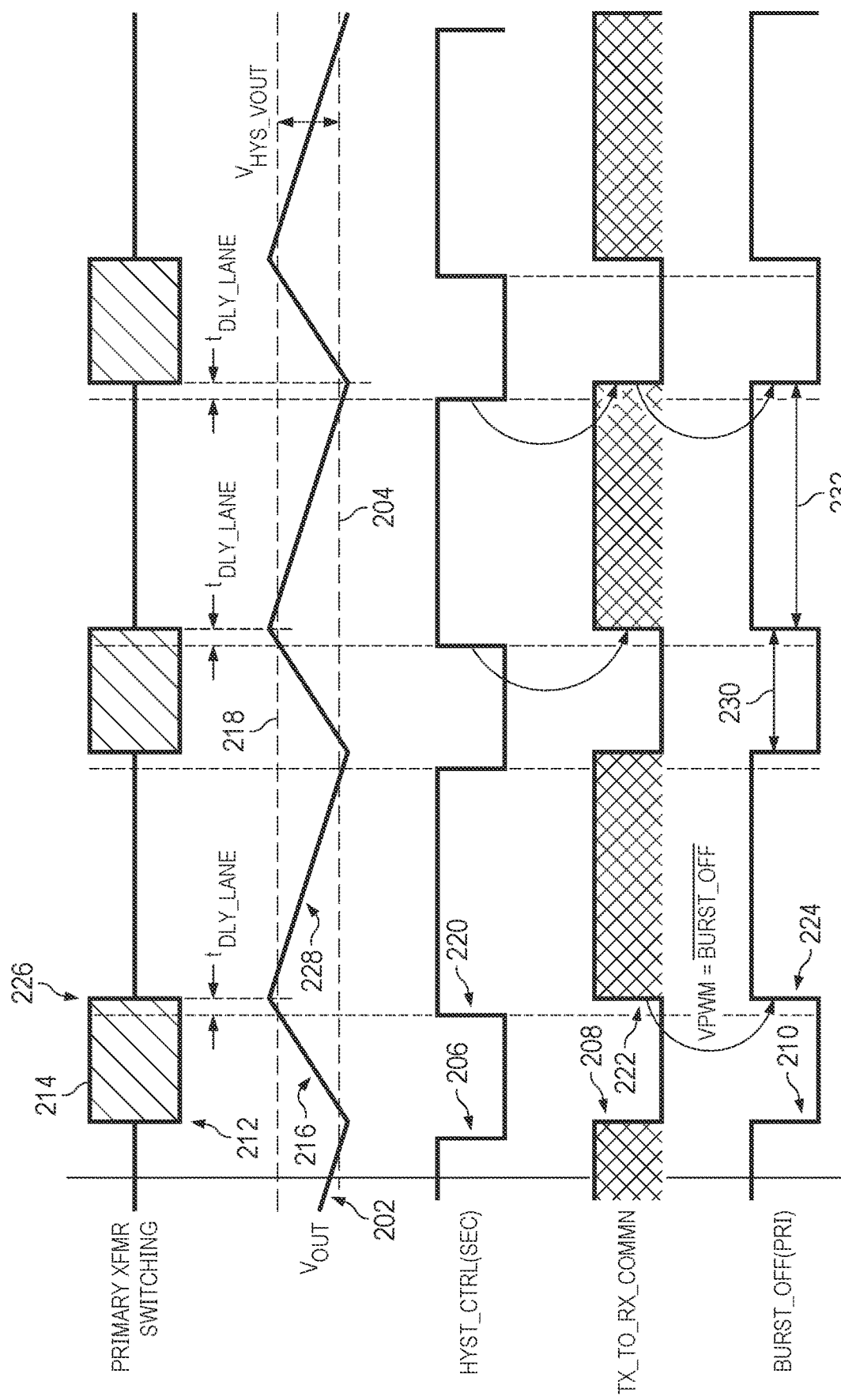
FIG. 2 is a timing diagram showing example operation waveforms for a DC-to-DC converter.

FIG. 2 shows example timing waveforms of energy transfer burst switching and hysteretic control feedback of a DC-to-DC converter like converter 100 of FIG. 1. A load current from the output (e.g., through $R_{LOAD}$ in FIG. 1) gradually discharges the output capacitor $C_{OUT}$, as indicated by the decrease 202 in voltage $V_{OUT}$ across the output capacitor $C_{OUT}$. Once the output voltage $V_{OUT}$ falls below a lower hysteretic threshold 204, as detected by output voltage detection circuitry in secondary-side circuitry 106 (which can include, e.g., a comparator), a hysteretic controller (e.g., in secondary-side circuitry 106) sends a signal through the feedback loop (e.g., via secondary-side lane communication transmitter 112, feedback lane 110, and primary-side lane receiver 114) to the primary-side circuitry 104 to activate the power transfer.

The feedback signal propagates 206, 208, 210 through three different waveforms HYST_CTRL(SEC), TX_TO_RX_COMMN, BURST_OFF(PRI) in FIG. 2, each having slightly different timing, each successively delayed from the previous. Within secondary-side circuitry 106, secondary-side hysteretic control signal HYST_CTRL (SEC) transitions low 206. The lane communication transmitter 112 encodes the secondary-side control signal information into the lane communication signal TX_TO_RX_COMMN, which is a delayed version of the secondary-side hysteretic control signal HYST_CTRL (SEC). Thus, secondary-side hysteretic control signal HYST_CTRL(SEC) transitioning low 206 prompts lane communication signal TX_TO_RX_COMMN to go low 208 within secondary-side lane communication transmitter 112. In turn, within the primary-side circuitry 104, primary-side energy transfer burst deactivation signal BURST_OFF(PRI) transitions low 210, causing primary-side circuitry 104 to begin energizing 212 the transformer 108 at the switching frequency of the converter 100.

During the primary transformer switching 214 (e.g., at a switching frequency of between about 10 megahertz and about 50 megahertz), the output capacitor $C_{OUT}$ charges, as indicated by the increase 216 in voltage $V_{OUT}$ across the output capacitor. In the illustrated example, the feedback lane delay $t_{DLY\_LANE}$ includes not only the propagation time of the feedback signal across the isolation barrier 102, but also delay between the time that the secondary-side output voltage detection circuitry detects that the output voltage $V_{OUT}$ has reached a threshold and the time that the lane communication transmitter 112 encodes the secondary-side hysteretic control signal HYST_CTRL(SEC) into the lane communication signal TX_TO_RX_COMMN.

Owing to the feedback lane delay $t_{DLY\_LANE}$, the transformer 108 does not start switching 212 instantaneously after the output voltage $V_{OUT}$ falls below the lower hysteretic threshold 204. Thus, the output voltage $V_{OUT}$ is permitted to fall slightly below the lower hysteretic threshold 204 before the transformer 108 switching 214 begins 212, the output capacitor $C_{OUT}$ begins recharging, and the output voltage $V_{OUT}$ begins to rise again 216.

As the output voltage $V_{OUT}$ rises 216 and the output capacitor $C_{OUT}$ is charged, the output voltage reaches an upper hysteretic threshold 218. The output voltage detection circuitry detects the output voltage surpassing the threshold 218 (e.g., the comparator flips state), causing the secondary-side hysteretic control signal HYST_CTRL(SEC) to go high 220. The secondary-side hysteretic control signal HYST_C-TRL(SEC) is encoded into the lane communication signal TX_TO_RX_COMMN by lane communication transmitter 112, which likewise transitions high 222. The lane communication signal TX_TO_RX_COMMN is again delayed through the feedback lane 110, resulting in primary-side energy transfer burst deactivation signal BURST_OFF(PRI) transitioning high 224 a lane delay time $t_{DLY\_LANE}$ after the output voltage $V_{OUT}$ crosses above the upper hysteretic threshold 218. The primary-side circuitry 104 stops 226 energizing the transformer 108, and the output voltage $V_{OUT}$ falls 228, first below the upper threshold 218, then below the lower threshold 204, causing the hysteretic cycle to repeat with the recharging of the output capacitor $C_{OUT}$. As an example, the switching time 230 during which the transformer 108 is energized may be between about 1 microsecond and about 5 microseconds. Also as an example, the rest time 232 during which the transformer 108 is not switched may be between about 10 microseconds and about 100 microseconds.

The two hysteretic thresholds 204, 218 can be established, for example, by one or more voltage references in the secondary-side circuitry 106. As examples, the lower threshold can be 4.99 volts, and the upper threshold can be 5.01 volts. The difference $V_{HYS\_VOUT}$ between the two hysteretic thresholds 204, 218 dictates the initial ripple (peak-to-peak voltage variation over the hysteresis cycle) on the output capacitor. During the feedback lane delay time $t_{DLY\_LANE}$ after the output voltage $V_{OUT}$ has exceeded the upper threshold 218, the transformer continues to switch 214. As shown in FIG. 2, each time a hysteric threshold 204, 218 is reached by the output voltage $V_{OUT}$, there is a duration that corresponds to the feedback lane delay $t_{DLY\_LANE}$ during which the transformer 108 does not switch even though the secondary side demands energy transfer (a sub-minimum hysteresis threshold condition), or still switches even though the secondary side demands no energy transfer (a super-maximum hysteresis threshold condition). It is thus desirable that the feedback lane delay $t_{DLY\_LANE}$ be made as small as possible.

Figure 3:
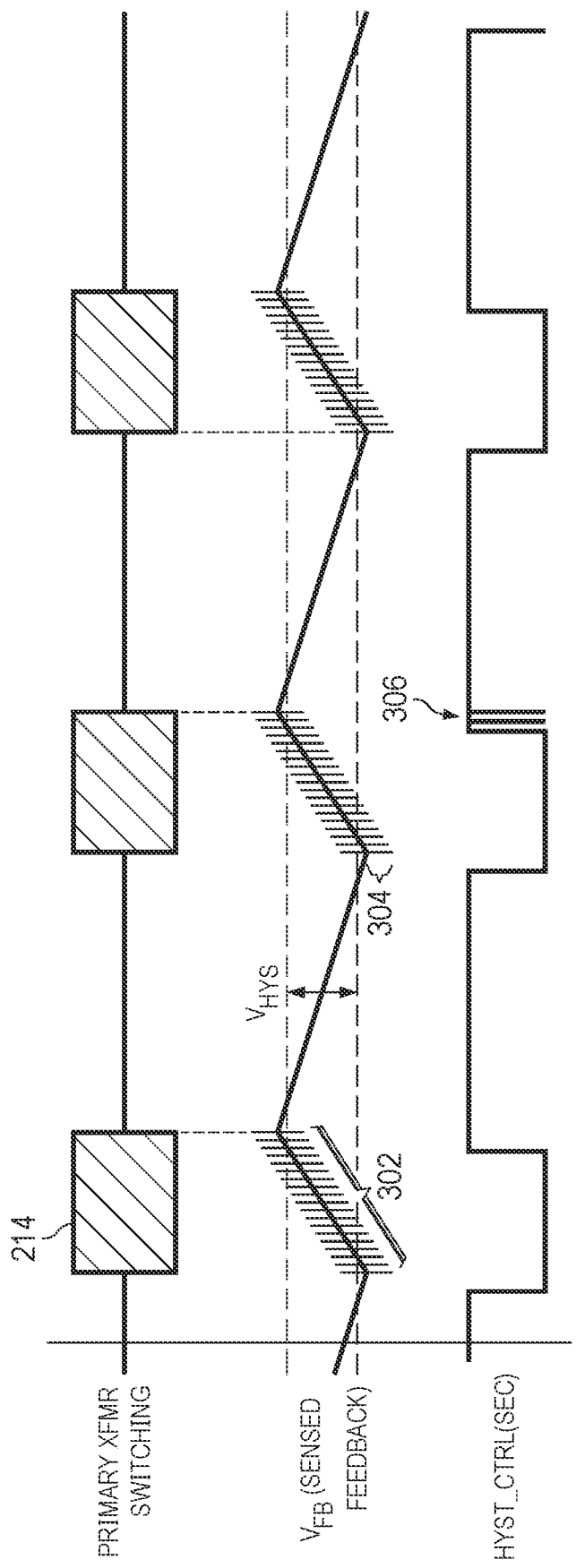
FIG. 3 is a timing diagram showing example operation waveforms for a DC-to-DC converter, and illustrating high-frequency switching noise and hysteretic control signal chattering.

The example timing waveforms of FIG. 3 show the switching 214 of transformer 108 and the secondary-side hysteretic control signal HYST_CTRL(SEC), as well as a sensed feedback signal $V_{FB}$. The output voltage $V_{OUT}$ across the output capacitor $C_{OUT}$ can be sensed directly or, if too large for comparison with an internal voltage reference, indirectly, using, e.g., a voltage divider, to provide a feedback voltage signal $V_{FB}$ that is proportional to and smaller than the output voltage $V_{OUT}$. For example, the feedback voltage $V_{FB}$ can be sensed at the middle of a two-resistor voltage divider arranged between the output voltage $V_{OUT}$ and ground (e.g., across the output capacitor). For example, a voltage divider of a factor of 1:4 can be used to bring an output voltage $V_{OUT}$ of 5 volts down to a sensed feedback voltage $V_{FB}$ of 1.25 volts. In such a case, a 20 millivolt hysteresis ripple on the output voltage $V_{OUT}$ translates into a 5 millivolt ripple on the sensed feedback voltage $V_{FB}$.

At high switching frequencies such as those used in monolithic DC-to-DC converters, the feedback signal $V_{FB}$ can be corrupted by high-frequency noise 302 during transformer switching 214. The noise can have an expected maximum negative noise amplitude 304, which can be determined from measurement or simulation. The noise 302 can be large enough to distort the hysteresis used in the hysteretic control, potentially causing chattering on the feedback signal, illustrated in FIG. 3 as chattering 306 on the secondary-side hysteretic control signal HYST_CTRL (SEC) and interfering with the transformer turn-off point. Such chattering may not be noticeable across the output capacitor $C_{OUT}$, because of the output capacitor's size and its tendency to act as a low-pass filter. Internally to secondary-side circuitry 106, however, it may be undesirable to include capacitive filtering of the feedback signal, which would effectively delay the transmission of feedback information between the secondary-side circuitry 106 and the primary-side circuitry 104. Minimizing the amount of capacitance filtering the feedback signal means, however, that the feedback signal may exhibit high-frequency switching noise 302 when the transformer is switching 214.

Figure 4:
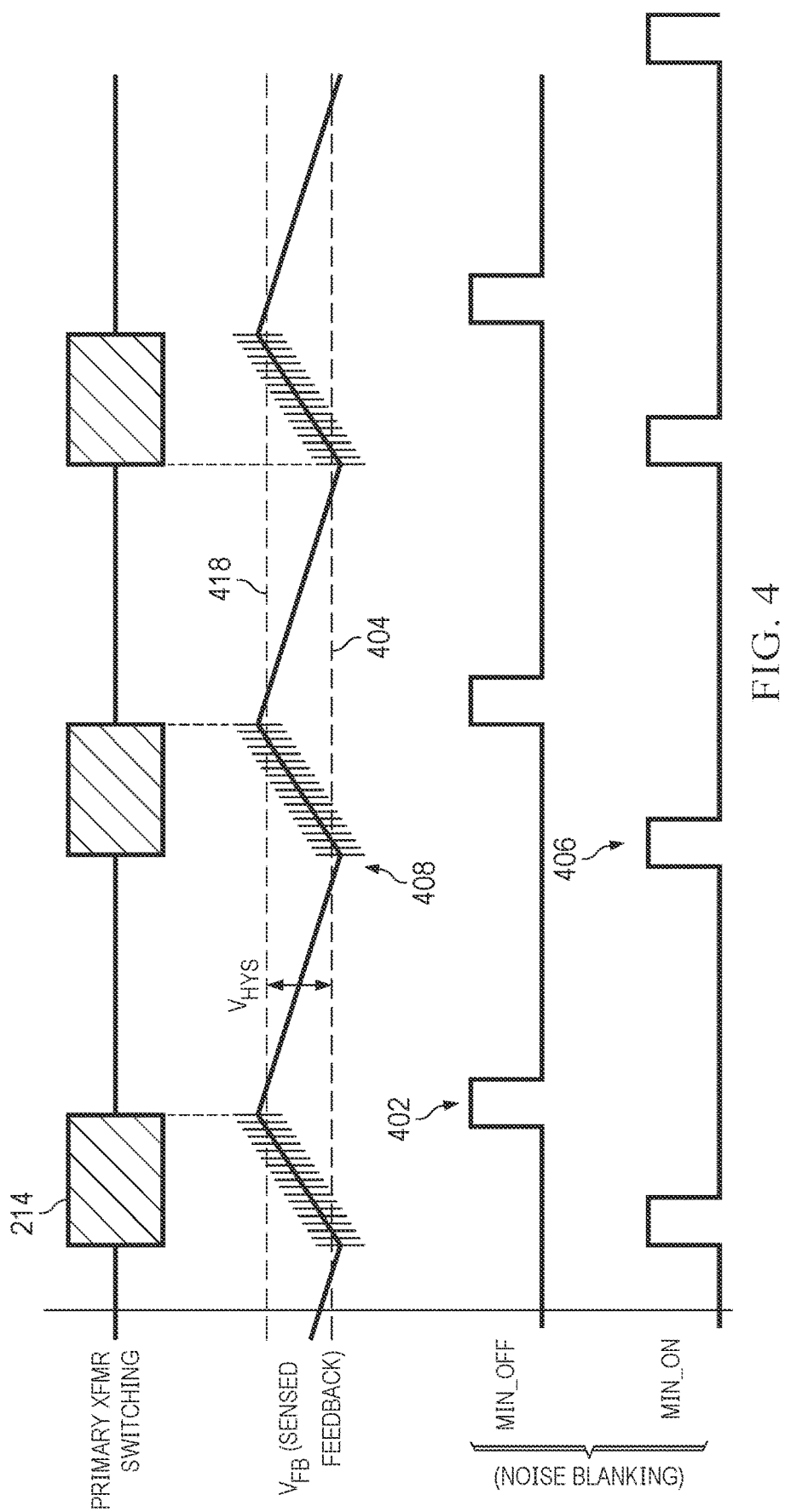
FIG. 4 is a timing diagram showing example operation waveforms for a DC-to-DC converter having minimum burst off-time and minimum burst on-time blanking signals.

With regard to FIG. 4, one approach to address the chattering 306 shown in FIG. 3 is to introduce a minimum burst on-time and a minimum burst off-time, which can be referred to as blanking times, for the hysteretic comparator transformer turn-on and turn-off instants (burst edges). As the sensed feedback signal $V_{FB}$ reaches an upper hysteretic threshold 418, a comparator that compares the sensed feedback $V_{FB}$ with a reference voltage is latched. The comparator enters a first latched state that results in a minimum burst off-time blanking pulse 402 in signal MIN_OFF. The minimum burst off-time blanking pulse 402 prevents the comparator from changing state until an elapse of a minimum off duration (the pulse width of the blanking pulse 402 in signal MIN_OFF).

Owing to this prevention of comparator state change, high-frequency noise on the sensed feedback signal $V_{FB}$ will not cause the comparator output to chatter. Similarly, as the sensed feedback signal $V_{FB}$ reaches a lower hysteretic threshold 404, the comparator is again latched and enters a second latched state that results in a minimum on time pulse 406 in signal MIN_ON. This minimum on time pulse 406 prevents the comparator from changing state until an elapse of a minimum-on duration. On the turn-on side, the noise issue is less severe, because when the sensed feedback voltage $V_{FB}$ falls below the lower threshold 404, the comparator evaluates the difference between sensed feedback $V_{FB}$ and a reference voltage for lower threshold 404 at a point in time 408 when the transformer is not switching and the sensed feedback $V_{FB}$ is relatively quiet in terms of noise. Thus, although the minimum on-time signal MIN_ON may provide some benefit, employment of a minimum burst off-time signal MIN_OFF yields the greater improvement in hysteresis control functioning because the noise-induced chattering problem severity is more pronounced on the turn-off side.

The amount of power that the DC-to-DC converter 100 can deliver to a power-consumptive load can depend upon the duty cycle during which the transformer 108 can be kept switching. To turn on the transformer 108 in a converter 100 that includes the MIN_OFF signal as in FIG. 4, the converter 100 must wait at least for the minimum burst off-time (e.g., the duration of a blanking pulse 402) before the transformer 108 can be turned back on again to recharge output capacitor $C_{OUT}$. To deliver more overall power to load $R_{LOAD}$, the transformer must be re-energized as rapidly as possible. However, given sufficient power draw through $R_{LOAD}$, the converter output voltage $V_{OUT}$, and thus the sensed feedback $V_{FB}$, may fall faster than minimum burst off-time, meaning that the transformer cannot be energized to restore power transfer even though the sensed feedback has fallen below the lower threshold 404. The use of a minimum burst off-time can thus impact power delivery by limiting the maximum burst frequency at which power can be delivered (which differs from the transformer switching frequency). A maximum burst frequency restriction for converter 100 is imposed, for example, when employing an extended minimum burst off-time for noise blanking. The extended minimum burst off-time for blanking thus limits maximum power delivery. A longer minimum burst on-time for extended noise blanking, on the other hand, can require pre-load (minimum-load) at external no-load conditions. Extended minimum burst on-time for blanking can cause over-voltage at no-load.

Figure 5A:
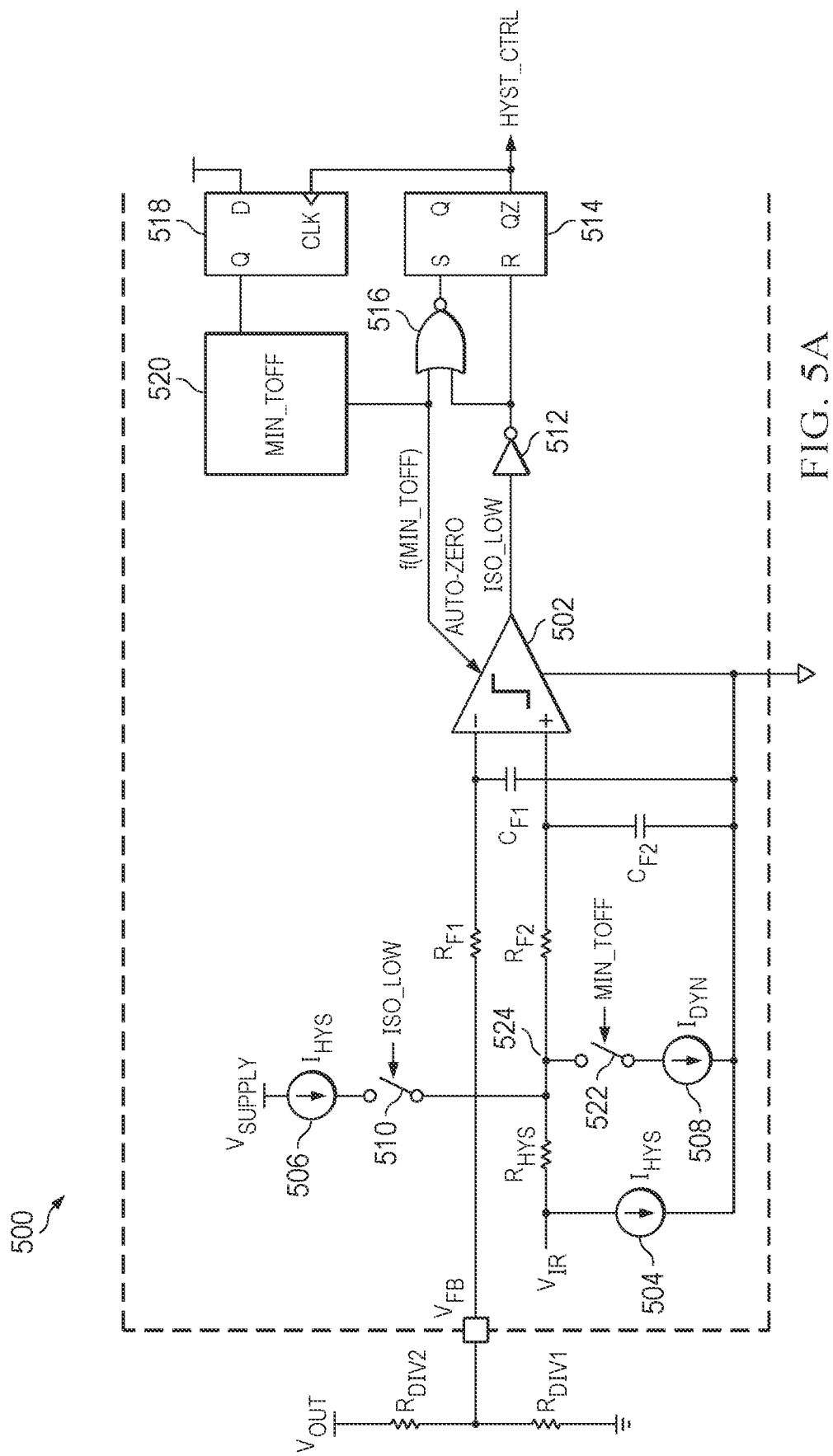
FIG. 5A is a circuit schematic of an example secondary-side hysteretic feedback control circuitry for providing hysteretic burst mode noise immunity with dynamic hysteresis in a DC-to-DC converter.

FIG. 5A is a circuit schematic illustrating example secondary-side hysteretic feedback control circuitry 500 for providing hysteretic burst mode noise immunity with dynamic hysteresis in a DC-to-DC converter such as converter 100 of FIG. 1. A voltage divider comprising resistors $R_{DIV1}$ and $R_{DIV2}$ can be included to downscale converter output voltage $V_{OUT}$ so as to provide sensed feedback signal $V_{FB}$. In some examples, the voltage divided is provided outside of and electrically coupled to the DC-to-DC converter 100. In some examples, other circuitry is used to provide a sensed feedback signal $V_{FB}$ from output voltage $V_{OUT}$, rather than a voltage divider.

As an example, the voltage divider comprising $R_{DIV1}$, $R_{DIV2}$ is configured to provide a scaling ratio of 1:4, and a 20 millivolt peak-to-peak hysteretic ripple at the converter output voltage $V_{OUT}$ is downscaled by the voltage divider into a 5 millivolt peak-to-peak hysteretic ripple at the sensed feedback terminal $V_{FB}$. The sensed feedback signal $V_{FB}$ is provided as a comparator first input voltage signal to an inverting input terminal (−) of a comparator 502. The comparator can be implemented, for example, as an amplifier configured to swing in two directions, rail to rail. In some examples, as illustrated in FIG. 5A, the comparator first input voltage signal can be filtered by a low-pass filter comprising a first filter resistor $R_{F1}$ and a first filter capacitor $C_{F1}$ before being provided to comparator 502. The comparator 502 compares the comparator first input voltage signal, representative of the output voltage $V_{OUT}$ and thus of the charge level of the output capacitor $C_{OUT}$, with a comparator second input voltage signal, which serves as a dynamic reference voltage.

Internal voltage reference $V_{IR}$ provides a common-mode voltage upon which a dynamic reference voltage is based and from which the dynamic reference voltage is dynamically modified, either to a lower hysteretic threshold voltage 404, an upper hysteretic threshold voltage 418, or to other threshold voltages, as described below. A combination of three current sources can together provide the dynamism of the comparator second input voltage signal, via hysteretic reference resistor $R_{HYS}$, to a noninverting input terminal (+) of the comparator 502. The first of these three current sources is first hysteretic current source 504 configured to provide current $I_{HYS}$ through hysteretic reference resistor $R_{HYS}$. The first hysteretic current source 504 is coupled at its negative terminal to the internal voltage reference $V_{IR}$ (providing, e.g., 2.5 volts) and to a first end of hysteretic reference resistor $R_{HYS}$, and at its positive terminal to a low-voltage rail (e.g., a circuit ground).

The second of the three current sources is second hysteretic current source 506, which is also configured to provide current $I_{HYS}$ through hysteretic reference resistor $R_{HYS}$. The second hysteretic current source 506 is coupled (in series with hysteretic threshold switch 510) at its negative terminal to a supply voltage $V_{SUPPLY}$ (providing a voltage greater than that provided by internal voltage reference $V_{IR}$, e.g., $V_{SUPPLY}$=5 volts) and at its positive terminal to a second end of the hysteretic reference resistor $R_{HYS}$ at node 524.

The third of the three current sources is a dynamic function current source 508 $I_{DYN}$. The dynamic function current source 508 is coupled (in series with dynamic ramp switch 522) at its positive terminal to the low-voltage rail (e.g., the circuit ground) and at its negative terminal to the second end of the hysteretic reference resistor $R_{HYS}$ at node 524.

In some examples, as illustrated in FIG. 5A, the comparator second input voltage signal can be filtered by a low-pass filter comprising a second filter resistor $R_{F2}$ and a second filter capacitor $C_{F2}$ before being provided to comparator 502. Example values of the circuit components in the schematic of FIG. 5A are given in Table 1.

TABLE 1

| Component/Duration | Example value(s) |
| --- | --- |
| Ratio of voltage divider ($R_{DIV1}$, $R_{DIV2}$) | 1:2 or 1:4 |
| Filter resistances $R_{F1}$, $R_{F2}$ | 100 kiloohms |
| Filter capacitances $C_{F1}$, $C_{F2}$ | 20 picofarads |
| Hysteretic reference resistance $R_{HYS}$ | 2.5 kiloohms |
| Internal reference voltage $V_{IR}$ | 2.5 volts |
| Supply voltage $V_{SUPPLY}$ | 5.0 volts |
| First and second hysteretic currents $I_{HYS}$ | 2.0 microamps |
| Dynamic ramp duration $t_{MIN\_TOFF}$ | 1.0 microseconds |

The resistance of the hysteretic reference resistor $R_{HYS}$, the voltages of the internal reference voltage $V_{IR}$ and the supply voltage $V_{SUPPLY}$, and the first and second hysteretic currents $I_{HYS}$ flowing through the hysteretic reference resistor $R_{HYS}$ can be configured (e.g., at circuit design time, or, with adjustable components, at circuit operation time) to set the values of the lower and upper hysteretic thresholds 404, 418. For example, values of $R_{HYS}$=2.5 kiloohms and $I_{HYS}$=2.0 microamps establish a 5 millivolt hysteretic ripple $V_{HYS}$ on top of the internal reference voltage $V_{IR}$. When the sensed feedback voltage $V_{FB}$ rises above the upper hysteretic threshold 418 (e.g., 2.5 volts plus 5 millivolts), the inverting input terminal (−) of the comparator 502 is at a higher voltage than the noninverting input terminal (+) of the comparator 502, causing the comparator output signal ISO_LOW signal to go low. The comparator output signal ISO_LOW is provided to a hysteretic threshold switch 510. When closed (when the comparator output signal ISO_LOW is high), the hysteretic threshold switch changes the effective hysteretic threshold from the low hysteretic threshold 404 to the high hysteretic threshold 418.

The comparator output signal ISO_LOW is also inverted by inverter 512 and thereafter provided to the reset input of an S-R latch 514 in FIG. 5A. The output of inverter 512 is also provided to an input of a NOR gate 516. When the comparator output signal ISO_LOW transitions low, the output of the inverter 512 transitions high, the set input of the S-R latch 514 transitions low, and the reset input of the S-R latch 514 transitions high. When the reset input of the S-R latch 514 is thus asserted and the set input of the S-R latch 514 is thus de-asserted, the inverting output QZ of the S-R latch 514 is asserted (transitions high). The inverting output QZ of the S-R latch 514 produces the hysteretic control signal HYST_CTRL, which can correspond to the secondary-side hysteretic control HYST_CTRL(SEC) of the example waveforms of FIGS. 2 and 3. The hysteretic control signal HYST_CTRL is provided as an output of hysteretic feedback control circuitry 500. The hysteretic control signal HYST_CTRL can thus serve as a basis for a feedback signal that travels through the feedback lane 110 across the isolation barrier 102 to primary-side circuitry 104, which controls the switching of the transformer 108, as shown in FIG. 1.

Figure 5B:
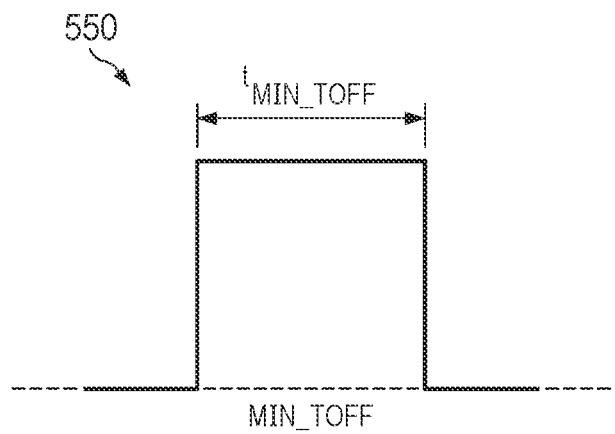
FIG. 5B is a plot of an example dynamic ramp activation signal produced by the one-shot timing pulse generator of the hysteretic feedback control circuitry of FIG. 5A.

The hysteretic feedback control circuitry 500 of FIG. 5A includes an internal feedback loop to improve the provided hysteretic control by addressing the issue of switching-noise-based feedback signal chattering described above. In addition to serving as the output of circuitry 500, the hysteretic control signal HYST_CTRL in FIG. 5A is also provided as a clock input CLK of a D latch 518. When the hysteretic control signal HYST_CTRL transitions high, the D latch 518 is triggered and the output Q of the D latch 518 transitions high. The output Q of the D latch 518 is provided as a triggering input to one-shot timing pulse generator 520. One-shot timing pulse generator 520 is configured to output a dynamic ramp activation signal MIN_TOFF having a logical-high pulse 550 (as shown in FIG. 5B) of temporal width $t_{MIN\_TOFF}$ upon triggering of the one-shot timing pulse generator 520. The time $t_{MIN\_TOFF}$ sets a maximum duration of a dynamic ramp produced by current source 508. As an example, the dynamic ramp duration $t_{MIN\_TOFF}$ can be selected to be about the duration of the lane delay $t_{DLY\_LANE}$, e.g., about 1 microsecond in examples described herein.

The dynamic ramp activation signal MIN_TOFF, or a signal based thereon, can be provided to the comparator 502 as an auto-zero calibration signal to eliminate input offset voltage errors. The dynamic ramp activation signal MIN_TOFF can be provided to the NOR gate 516, such that for the duration $t_{MIN\_TOFF}$ of the MIN_TOFF pulse, the set input of the S-R latch 514 is held low. Thus, the hysteretic control signal HYST_CTRL is prevented from chattering 306 for at least the duration $t_{MIN\_TOFF}$.

Figure 5C:
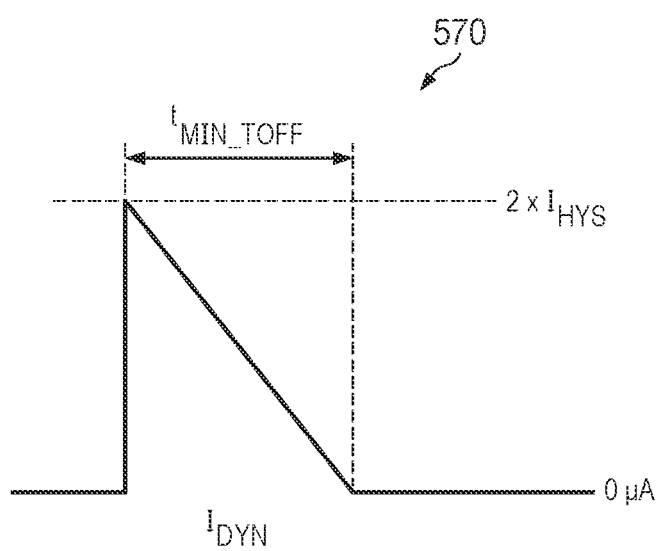
FIG. 5C is a plot of an example dynamic ramp signal produced by the dynamic function current source of the hysteretic feedback control circuitry of FIG. 5A.

The dynamic ramp activation signal MIN_TOFF is provided to a dynamic ramp switch 522 in series with the dynamic function current source 508. In the example circuitry 500 of FIG. 5A, the dynamic function current source 508 is coupled or uncoupled to the hysteretic reference resistor $R_{HYS}$ based on the state of the dynamic ramp switch 522 (open or closed) and thus based on the present logical value of the dynamic ramp activation signal MIN_TOFF (low or high). When the output Q of the D latch 518 transitions high, it causes the one-shot timing pulse generator 520 to close dynamic ramp switch 522 for a dynamic ramp duration $t_{MIN\_TOFF}$, and for dynamic function current source 508 to produce an inverted sawtooth function $I_{DYN}$ (shown as function 570 in FIG. 5C) that ramps down from about twice the value of $I_{HYS}$ (e.g., 4 microamps) to 0 microamps over the dynamic ramp duration $t_{MIN\_TOFF}$ when the dynamic ramp switch 522 is closed. In some examples, the amplitude of the function $I_{DYN}$ can be based on the expected maximum negative noise amplitude of transformer switching noise in the output or feedback signal to which the hysteretic threshold is compared. As examples, the amplitude of the function $I_{DYN}$ can be chosen to provide a voltage reduction in the dynamic threshold (e.g., voltage reduction 628 in FIG. 6C) that is at least, equal to, or about equal to the maximum negative noise amplitude.

Still with reference to FIG. 5A, during the dynamic ramp duration $t_{MIN\_TOFF}$, when the dynamic ramp switch 522 is closed and the dynamic function current source 508 produces its inverted sawtooth function $I_{DYN}$, current is drawn out of node 524 to which the hysteretic reference resistor $R_{HYS}$ is coupled. Thus, during the dynamic ramp duration $t_{MIN\_TOFF}$, the comparator second input voltage signal (reference voltage) provided to the non-inverting input terminal (+) of the comparator 502 is temporarily and diminishingly reduced. The non-inverting input terminal (+) of the comparator 502 thus experiences an initial $2I_{HYS}R_{HYS}$ drop in voltage, providing a dynamic hysteresis to eliminate or mitigate turn-off edge noise sensitivity caused by the high-frequency switching noise. For example, if $I_{HYS}$ is 2 microamps and $R_{HYS}$ is 2.5 kiloohms, the initial 4 microamps supplied by the dynamic function current source 508 initially reduces the comparator second input voltage signal by 10 millivolts.

Even though the sensed feedback signal $V_{FB}$ is unaffected, the voltage drop of the second comparator input voltage signal (reference voltage) results in the output ISO_LOW of the comparator 502 not toggling between states at the transformer turn-off transition, and a false or chattering transition of the hysteretic control signal HYST_CTRL, like chattering 306 in FIG. 3, is thus avoided. The internal feedback loop of the hysteretic feedback control circuitry 500, including the dynamic function current source 508, ensures that the signals ISO_LOW and HYST_CTRL both stay in the same respective states irrespective of any noise seen at the sensed feedback voltage terminal $V_{FB}$ that may be cause, e.g., by the high-frequency switching noise.

Figure 6A:
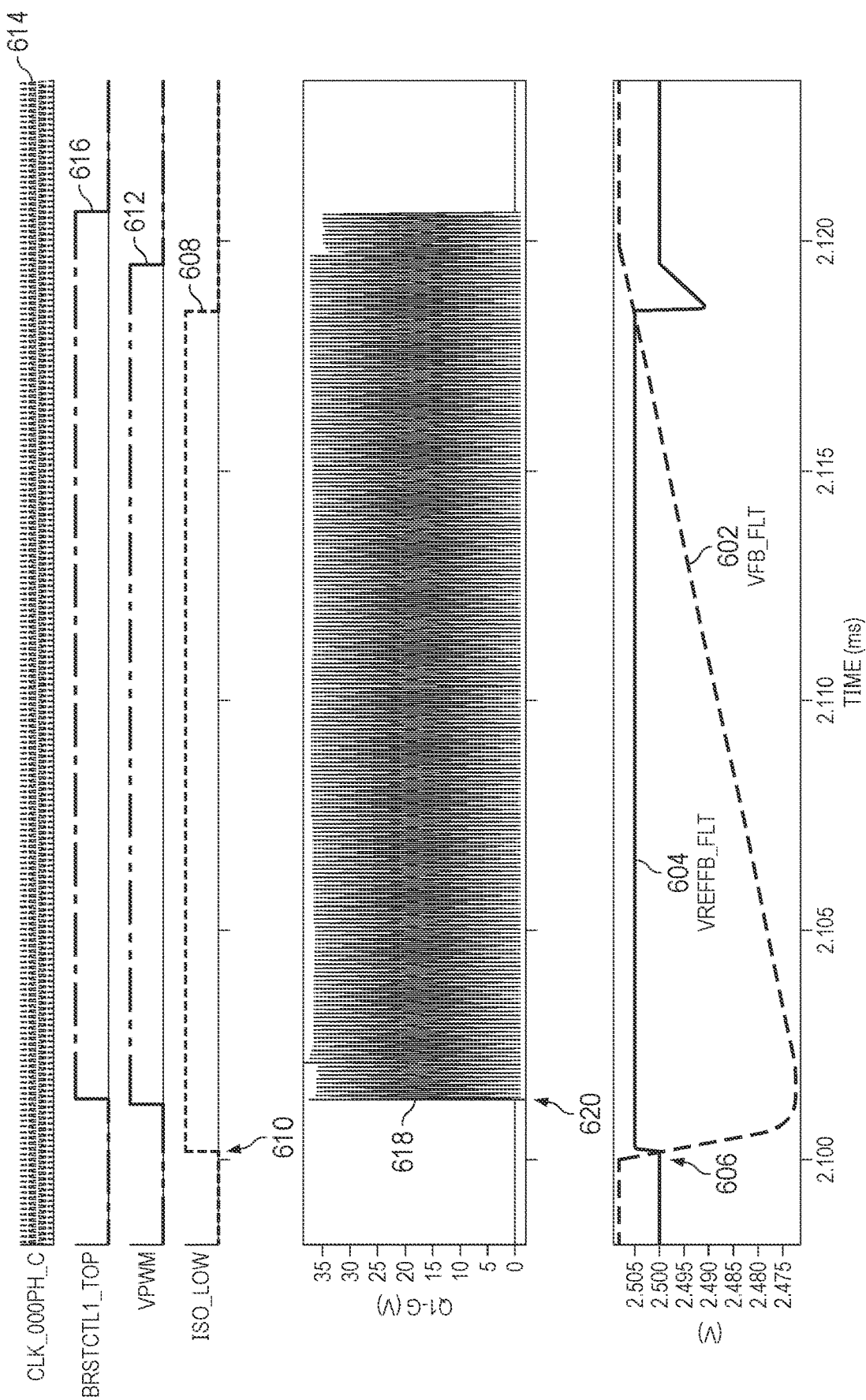
FIGS. 6A-6C are example timing diagrams illustrating the functioning of the hysteretic feedback control circuitry of FIG. 5A.
Figure 6B:
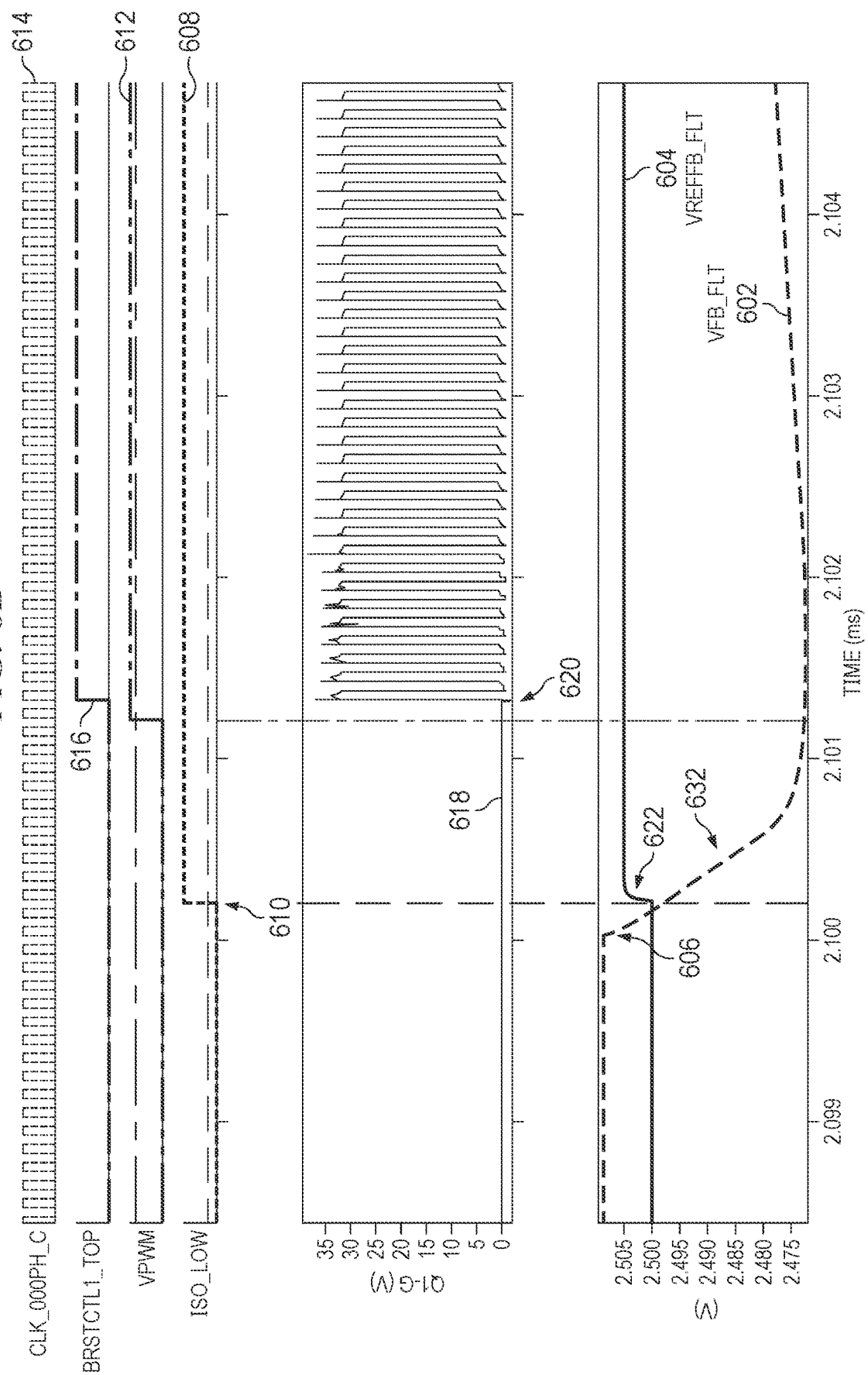
Figure 6C:
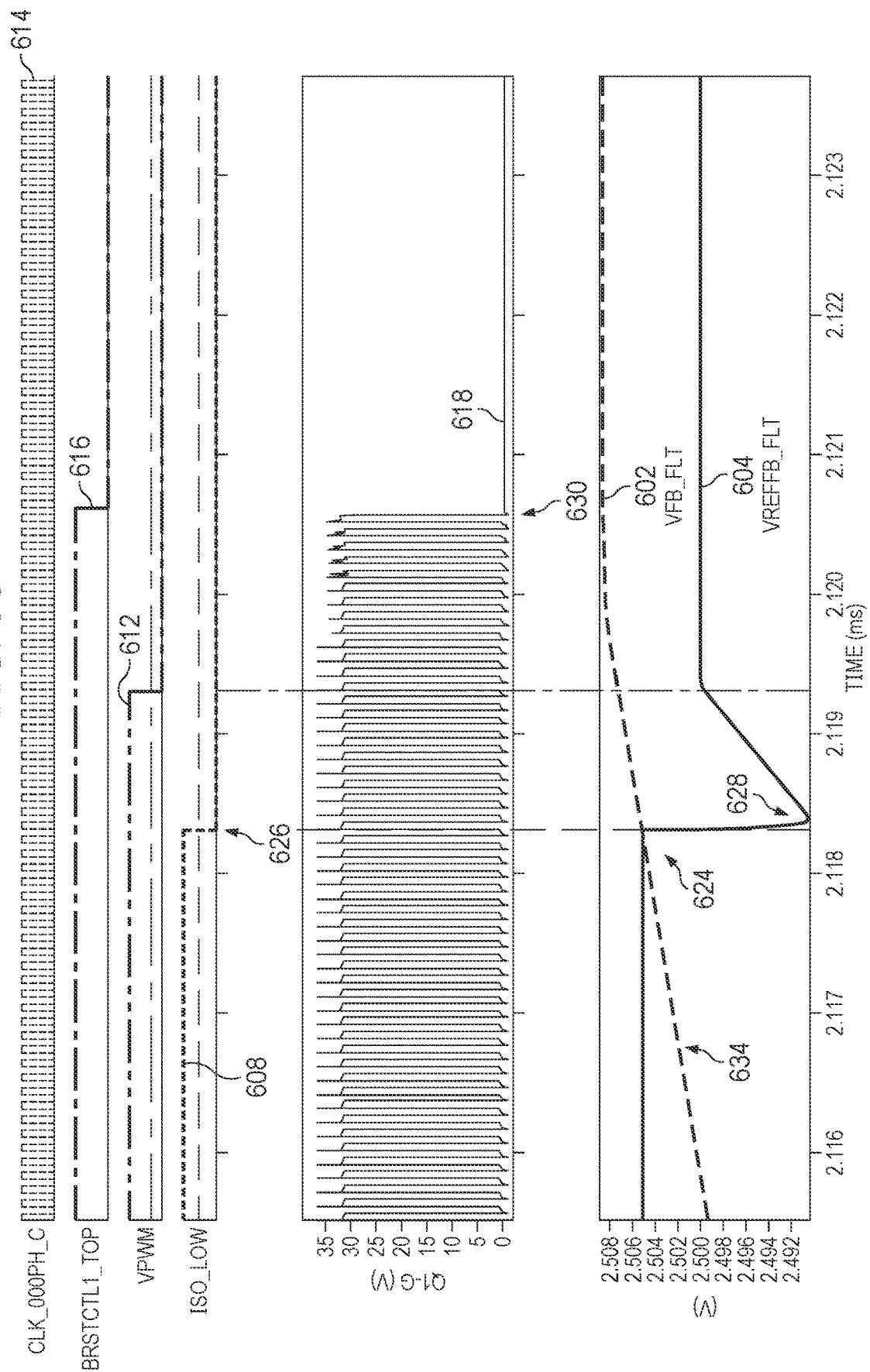

The example timing diagrams of FIGS. 6A-6C show simulation results illustrating the functioning of the hysteretic feedback control circuitry 500. FIG. 6A shows a full transformer turn-on, turn-off cycle. FIG. 6B provides a 5λ (in the time dimension) zoomed-in view of the transformer turn-on portion of FIG. 6A. FIG. 6C provides a 5λ (in the time dimension) zoomed-in view of the transformer turn-off portion of FIG. 6A. The filtered feedback voltage signal VFB_FLT 602 is the comparator first input voltage signal provided to the inverting input terminal (−) of a comparator 502. The filtered feedback reference voltage signal VREF-FB_FLT 604 is the comparator second input voltage signal provided to the non-inverting input terminal (+) of a comparator 502.

With reference to FIGS. 6A and 6B, at 2.100 milliseconds, the filtered feedback voltage signal VFB_FLT 602 drops 606 because the sensed feedback voltage $V_{FB}$ has dropped below the lower hysteretic threshold 404. At this time, the load current (through $R_{LOAD}$) continues to draw energy from the output capacitor $C_{OUT}$, and the transformer 108 has not yet started switching. Within about half a microsecond after the filtered feedback voltage signal VFB_FLT 602 becomes less than the filtered feedback reference voltage signal VREF- FB_FLT 604, the comparator 502 changes state and the comparator output signal ISO_LOW 608 transitions high 610.

The comparator output signal ISO_LOW 608 transitioning high 610 in turn brings the hysteretic control signal HYST_CTRL low, as shown, for example, at 206 in FIG. 2, in accordance with the functioning of the inverter 512 and the S-R latch 514 shown in FIG. 5A. A feedback signal based on the hysteretic control signal HYST_CTRL is propagated across the isolation barrier 102 via the feedback lane 110 as described above. A pulse-width-modulation transformer switching activation voltage signal VPWM 612, which is the logical inverse of primary-side energy transfer burst deactivation signal BURST_OFF(PRI) shown in FIG. 2, can be generated by the primary-side circuitry 104 responsive to the receipt of the feedback signal on the primary side. Transformer switching activation voltage signal VPWM 612 represents decoded information coming from the lane receiver 114 on the primary side. Transformer switching activation voltage signal VPWM 612 is thus effectively a delayed version of the comparator output signal ISO_LOW 608, with about 1 microsecond of delay between the two signals in the example of FIGS. 6A-6C. On the primary side, transformer switching activation voltage signal VPWM 612 is synchronized to a primary-side power stage system clock CLK_000 PH_C 614 (e.g., a 50 megahertz clock) to produce burst control signal BRSTCTL1_TOP 616 that effects the activation and deactivation of a transformer burst.

The transformer switching waveform Q1-G 618 shows that the transformer 108 does not start switching 620 until about 2.10125 milliseconds, or about 1.05 microseconds after the comparator output signal ISO_LOW 608 transitions high 610 at 2.1002 milliseconds. Between these two times, energy continues to be depleted from the output capacitor $C_{OUT}$. The filtered feedback voltage signal VFB_FLT 602 continues decreasing until about 2.10145 milliseconds, at which point it begins gradually increasing again owing to the transfer of energy from the primary side to the secondary side from the switching 214 of the transformer 108, the resultant charging of the output capacitor $C_{OUT}$, and the increase of the output voltage $V_{OUT}$.

With reference to FIG. 6B, the output current through the load $R_{LOAD}$ discharges the output capacitor $C_{OUT}$ and causes the filtered feedback voltage signal VFB_FLT 602 to fall 632 below the filtered feedback reference voltage signal VREFFB_FLT 604. Then, just after ISO_LOW 608 transitions high 610, the filtered feedback reference voltage signal VREFFB_FLT 604 increases 622 by 5 millivolts, from 2.5 volts to 2.505 volts, starting at 2.10021 milliseconds, as a consequence of the closing of the hysteretic threshold switch 510 in FIG. 5A. After the filtered feedback reference voltage signal VREFFB_FLT 604 increases to 2.505 volts and the transformer switching activation voltage signal VPWM 612 transitions high, the transformer 108 starts switching 620. Once the transformer 108 starts switching 620, the filtered feedback voltage signal VFB_FLT 602 starts to slowly climb as the output capacitor charges up because of energy being transferred from the primary side to the secondary side through the transformer 108.

Thus, FIG. 6B illustrates the timing sequence at the transformer turn-on edge 620 in which the comparator output signal ISO_LOW 608 transitions from low to high 610, and the transformer switching activation voltage signal VPWM 612 follows the comparator output signal ISO_LOW 608 with the same polarity, transitioning from low to high at 2.1012 milliseconds after a delay that corresponds to the latency of the feedback lane 110. After the transformer switching activation voltage signal VPWM 612 and burst control signal 616 go high, the transformer starts to switch 620, as indicated by switching waveform Q1-G 618. The output capacitor $C_{OUT}$ starts charging up, as reflected in the rise of the filtered feedback voltage signal VFB_FLT 602 (between about 2.10145 milliseconds and 2.1205 milliseconds in the illustrated example). As the filtered feedback voltage signal VFB_FLT 602 rises, the filtered feedback reference voltage signal VREFFB_FLT 604 (the reference for the comparator 502) remains at 2.505 volts, corresponding to the upper hysteretic threshold 418.

With reference to FIG. 6C, when the voltage level of the rising filtered feedback voltage signal VFB_FLT 602 surpasses 624 the voltage level of the filtered feedback reference voltage signal VREFFB_FLT 604, the comparator output signal ISO_LOW 608 transitions from high to low 626. The feedback information contained in the comparator output signal ISO_LOW 608 transition 626 remains unpropagated to the primary side until a time when the transformer switching activation voltage signal VPWM 612 also transitions low. Between these two times (about 2.118307 milliseconds and 2.119307 milliseconds in the illustrated example), the transformer continues switching, as shown by waveform Q1-G 618. When the comparator output signal ISO_LOW 608 transitions low 626, the hysteretic threshold switch 510 opens, and the dynamic ramp switch 522 closes for the dynamic ramp duration $t_{MIN\_TOFF}$. The filtered feedback reference voltage signal VREFFB_FLT 604 temporarily drops 628, in the illustrated example by about 15 millivolts, as a consequence of the closing of dynamic ramp switch 522 and the introduction of current in an inverted sawtooth function $I_{DYN}$ from dynamic function current source 508.

The duration of the filtered feedback reference voltage drop 628 in FIG. 6C, which is 1 microsecond in the illustrated example, is the length of the dynamic ramp duration $t_{MIN\_TOFF}$. Because the hysteretic threshold switch 510 has been opened, when the filtered feedback reference voltage signal VREFFB_FLT 604 is restored (at about 2.119307 milliseconds in the illustrated example), it resumes a level corresponding to the lower hysteretic threshold 404, which in the illustrated example is 2.5 volts, rather than its previous value corresponding to the upper hysteretic threshold 418 of 2.505 volts. Then, shortly after 2.1205 milliseconds, the burst control signal 616 transitions low, and the transformer stops switching 630. The output capacitor $C_{OUT}$ is charged, and the hysteresis cycle can repeat.

Absent the internal feedback loop of the hysteretic feedback control circuitry 500, including the one-shot timing pulse generator 520 and the dynamic ramp switch 522 in series with the dynamic function current source 508, the filtered feedback reference voltage signal VREFFB_FLT 604 would be restored directly to the lower hysteretic threshold value of 2.5 volts from the upper hysteretic threshold value of 2.505 volts upon the transition 626 of the comparator output signal ISO_LOW 608 from high to low, and would not drop 628 (e.g., by 15 millivolts). In such a case, any noise around time 624 due to the transformer switching could falsely trip the state of the comparator 502 back again, resulting in the chattering 306 shown in FIG. 3.

The inverse-sawtooth hysteresis ramp signal $I_{DYN}$ can be applied for the dynamic ramp duration $t_{MIN\_TOFF}$ to widen hysteresis (in the voltage dimension) at the chattering-issue-prone transformer turn-off hysteresis edge, improving noise immunity. Because the chattering 306 is a problem principally or exclusively associated with the transformer turn-off hysteresis edge, introduction of the dynamic hysteresis ramp 628 can be made at the transformer turn-off hysteresis edge only, and not on the transformer turn-on hysteresis edge. As described above with regard to FIG. 3, the chattering 306 is due to high-frequency transformer switching noise 302 that is not present at the transformer turn-on hysteresis edge, when the transformer 108 is not yet being switched prior to the lane delay time after the comparator state change 610.

Two factors contribute to this difference between the turn-off and turn-on edges. First, with the load $R_{LOAD}$ demanding power from the primary side of the DC-to-DC converter 100, the filtered feedback voltage signal VFB_FLT 602 drops 632 in voltage faster at the transformer turn-on hysteresis edge (shown in FIG. 6B) than it rises 634 in voltage at the transformer turn-off hysteresis edge (shown in FIG. 6C). Second, lane delay $t_{DLY\_LANE}$ prevents high-frequency switching noise from immediately infecting the filtered feedback voltage signal VFB_FLT 602 after the comparator 502 first commands the transformer turn-on hysteresis edge by sending the comparator output signal ISO_LOW 608 transitions high 610. These two factors—the more rapid change in the feedback signal and the receiver delay at lane receiver 114—cause a natural widening of the hysteresis (in the voltage dimension) at transformer turn-on hysteresis edge that is not present at the transformer turn-off hysteresis edge. The secondary-side hysteretic feedback control circuitry 500 leverages the switching waveform profile to inject the dynamic hysteretic ramp only on the burst turn-off edge. Accordingly, the addition of blanking at the turn-on edge can be avoided, thus reducing impact on the power delivery frequency.

The secondary-side hysteretic feedback control circuitry 500 introduces a dynamic hysteretic ramp to adjust the hysteresis reference threshold for burst hysteretic control to improve noise immunity. The dynamic hysteretic ramp leverages the switching waveform profile to inject the dynamic ramp only on the burst off-edge, thereby avoiding the need for separate blanking for the burst on-edge. Adding the dynamic hysteretic ramp to only the turn-off edge, and not the turn-on edge, does not impose any limitation on the maximum burst frequency by implementing dynamic hysteresis threshold for burst off edge alone.

Figure 7:
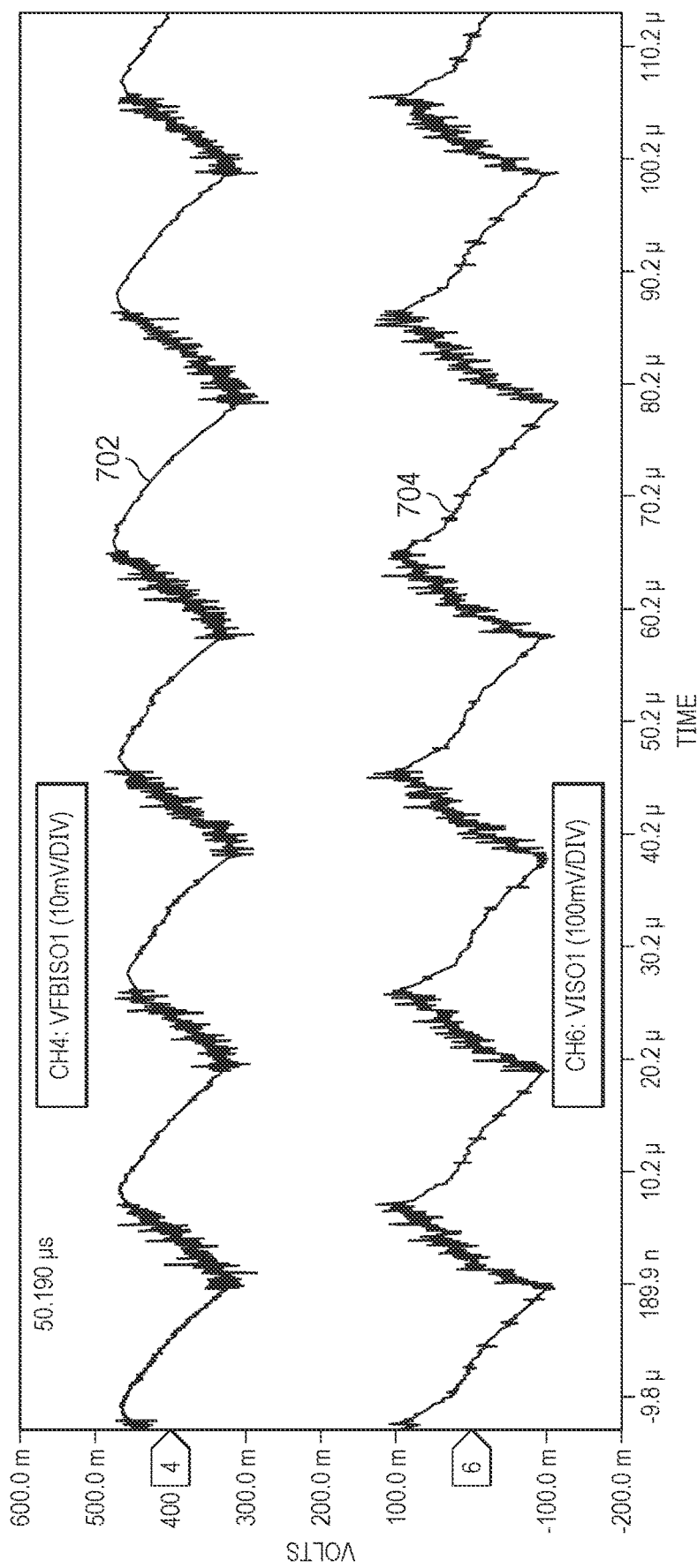
FIG. 7 shows example waveforms from an oscilloscope screen capture illustrating the functioning of the hysteretic feedback control circuitry of FIG. 5A.

The example waveforms of FIG. 7, from an oscilloscope screen capture, include the voltage at the feedback divider VFBISO1 702, which corresponds to the sensed feedback signal $V_{FB}$ described above with regard to FIGS. 3, 4, and 5A, and output capacitor ripple VISO1 704, which corresponds to the output voltage $V_{OUT}$ described above with regard to FIGS. 1, 2, and 5A. VFBISO1 702 is shown at 10 millivolts per vertical-axis division and VISO1 704 is shown at 100 millivolts per vertical-axis division. High-frequency transformer switching noise is evident in the rising portions of the voltage signals 702, 704.

Figure 8A:
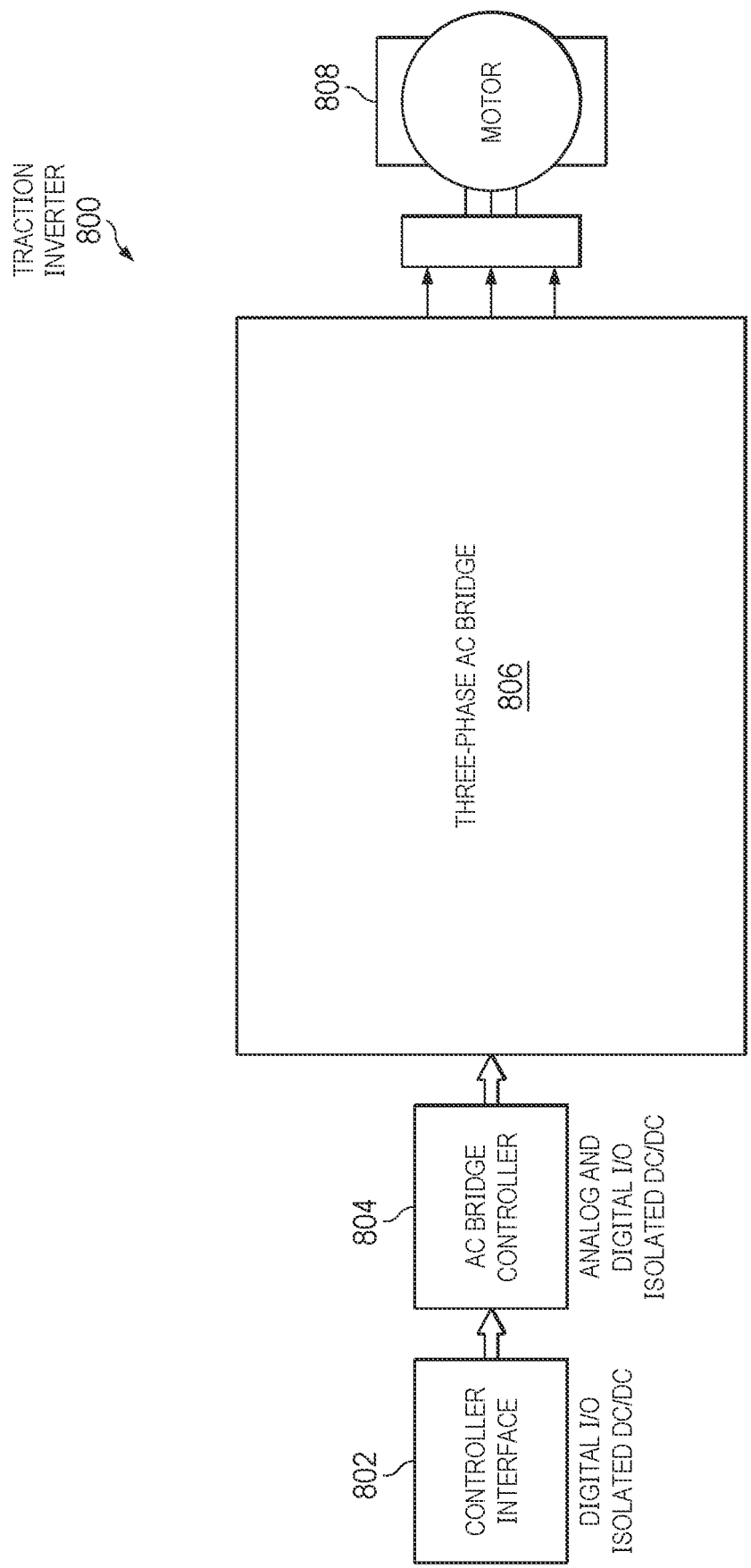
FIGS. 8A and 8B are block diagrams of an example traction inverter including a three-phase AC bridge that includes the hysteretic feedback control circuitry of FIG. 5A.
Figure 8B:
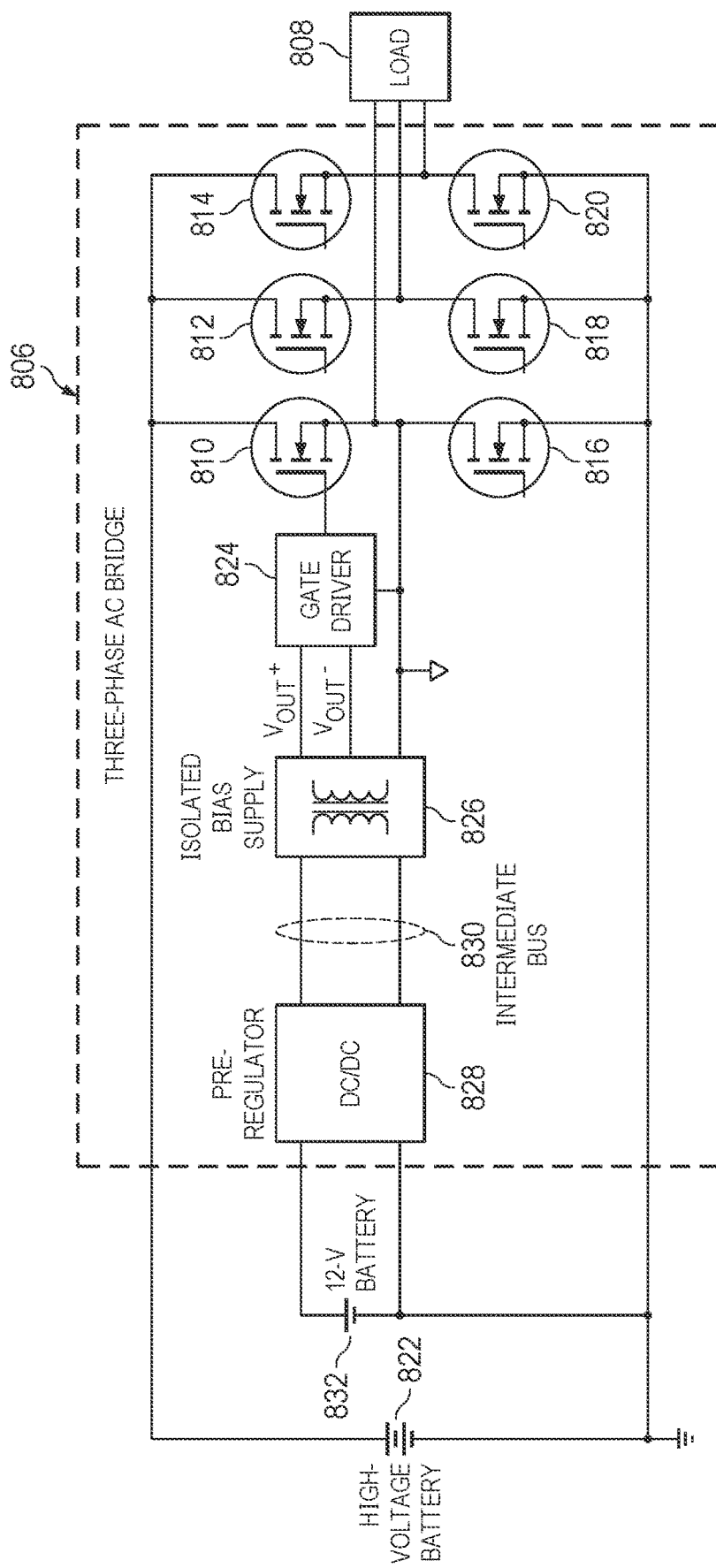

A DC-to-DC converter 100 including secondary-side hysteretic feedback control circuitry 500 in its secondary-side circuitry 106 can be used in industrial and automotive applications, such as on-board chargers in electric vehicles (EVs), sensing and control circuits in EVs, or a traction inverter 800 as shown in FIGS. 8A and 8B. As shown in FIG. 8A, controller interface 802 provides control inputs to AC bridge controller 804 (an AC drive controller), which in turns provides inputs to three-phase AC bridge 806 (a three-phase AC drive power stage). The three-phase AC bridge 806 in turn drives a load (e.g., a motor) 808.

As shown in FIG. 8B, three-phase AC bridge 806 has six insulated-gate bipolar transistors (IGBTs) 810, 812, 814, 816, 818, 820 which separately operate at high power levels, e.g., as supplied by high-voltage battery 822. Each IGBT 810, 812, 814, 816, 818, 820 is driven by a respective isolated gate driver 824. For simplicity, only one gate driver 824, coupled to IGBT 810, and associated circuitry 826, 828 are illustrated in FIG. 8B. Each isolated gate driver 824 is provided with a respective isolated bias supply 826 to provide power. Each bias supply 826 can be implemented as a monolithic DC-to-DC converter having integrated transformers, as described above. For example, each bias supply 826 can individually include its own instance of secondary-side hysteretic feedback control circuitry 500. The IGBTs 810, 812, 814, 816, 818, 820 are sensitive to the amount of current that they can carry. For applications such as the traction inverter 800 illustrated in FIG. 8, the output voltage that each gate driver 824 provides for its respective gate drive signals may need high accuracy, e.g., ±3% accuracy, to ensure overall system reliability. Each bias supply 826 is provided power from a DC/DC pre-regulator via an intermediate bus 830. Each pre-regulator 828, in turn, receives its power from a battery 832, e.g., a 12 volt battery.

The voltage supplied by the gate driver 824 determines the amount of current that its respective IGBT 810 can carry. The gate driver output that each gate driver 824 provides comes from the respective bias supply 826 that includes secondary-side hysteretic feedback control circuitry 500. Each bias supply 826 is therefore capable of highly regulated output voltage, to within +3% accuracy, with reduced output voltage ripple as compared to gate driver bias supplies that do not include secondary-side hysteretic feedback control circuitry 500. Output voltage levels outside of the expected accuracy negatively impact the IGBT current capability, thus reducing the overall reliability of system 800. Tightly controlling the regulation accuracy can be critical to reliable performance of system 800, but in a gate-driver application such as that shown in FIG. 8, activation or deactivation of the load $R_{LOAD}$ to draw energy from the output capacitor $C_{OUT}$ can create a switch node disturbance, perturbing the burst on/off transition. Blanking time alone, as described with regard to FIG. 4, is thus not sufficient to mitigate the above-described problem of false-trip and the consequent output voltage ripple deviations. Adequate regulation accuracy can be achieved in part using the circuits and methods described herein to increase noise immunity in the bias supplies and thus to reduce or eliminate burst hysteresis control signal chatter, to keep the hysteresis on the bias supply output voltage to a minimum (in the voltage dimension), and to thus maintain a high maximum burst frequency in each bias supply 826.

Figure 9A:
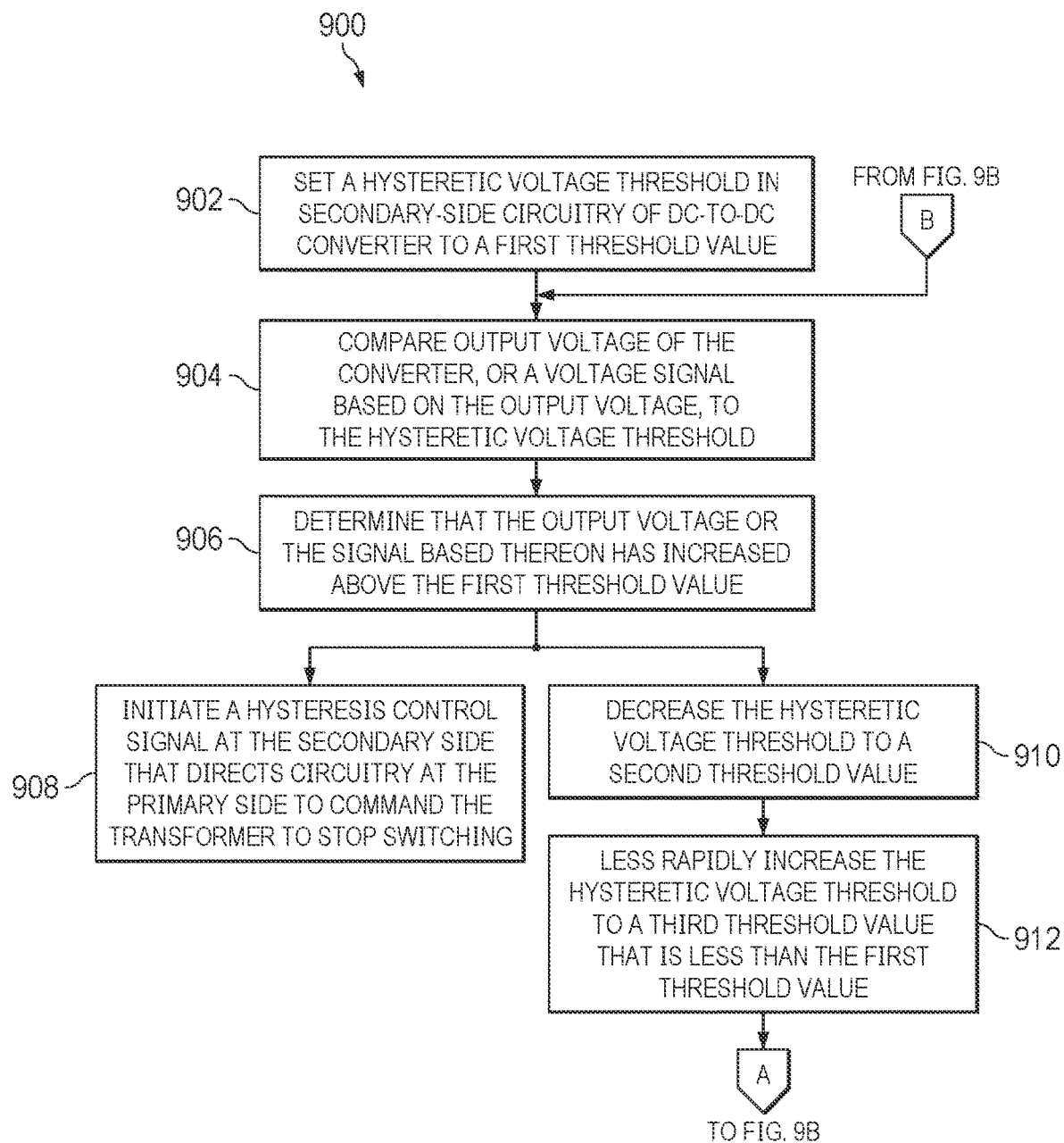
FIGS. 9A and 9B are flow charts showing example methods of dynamic hysteretic control of an isolated DC-to-DC converter.
Figure 9B:
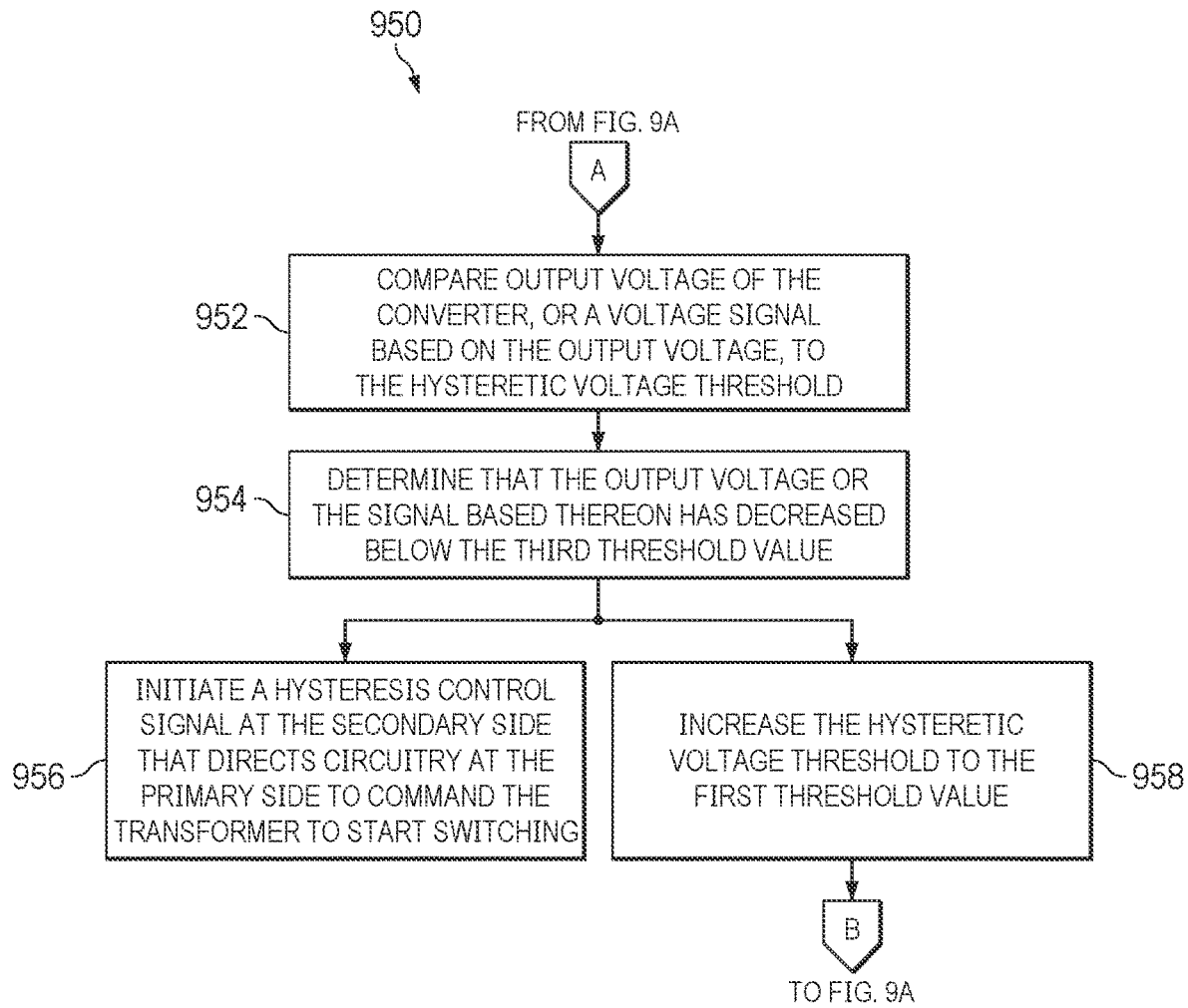

The flow charts of FIGS. 9A and 9B illustrate example methods 900, 950 of dynamic hysteretic control of an isolated DC-to-DC converter, such as the converter 100 of FIG. 1. Method 900 of FIG. 9A describes the transformer burst turn-off process. In method 900 as shown in FIG. 9A, a hysteretic voltage threshold in secondary-side circuitry of the converter is set 902 to a first threshold value (e.g., to upper hysteretic threshold 418 in FIG. 4, e.g., by closing hysteretic threshold switch 510 in FIG. 5A). An output voltage of the converter (e.g., output voltage $V_{OUT}$ in FIG. 1, 2, or 5A), or a voltage signal based on the output voltage (e.g., sensed feedback signal $V_{FB}$ of FIG. 3, 4, or 5A), can be compared 904 to the hysteretic voltage threshold (e.g., by comparator 502 in FIG. 5A). Based on the comparison 904, it can be determined 906 that the output voltage or the signal based thereon has increased above the first threshold value. The output voltage or the signal based thereon has a maximum negative noise amplitude (e.g., amplitude 304 in FIG. 3).

Based on determining 906 the increase, a hysteresis control signal (e.g., HYST_CTRL(SEC) in FIG. 2 or 3 or HYST_CTRL in FIG. 5A) can be initiated 908 at circuitry at a secondary side of the converter (e.g., secondary-side circuitry 106 in FIG. 1). The hysteresis control signal can direct circuitry at a primary side of the converter (e.g., primary-side circuitry 104 in FIG. 1) to command a transformer (e.g., transformer 108 in FIG. 1) of the converter to stop switching (burst off). The primary and secondary sides can be separated by an isolation barrier (e.g., isolation barrier 102 in FIG. 1) across which the transformer is arranged.

Based on determining 906 the increase, the hysteretic voltage threshold can be decreased 910 by an amount that is based on the maximum negative noise amplitude to a second threshold value (e.g., at 628 in FIG. 6C). For example, the decrease can be at least, equal to, or about equal to the maximum negative noise amplitude. Then, less rapidly than the decreasing, the hysteretic voltage threshold can be increased 912 to a third threshold value (e.g., lower hysteretic threshold 404 in FIG. 4) that is less than the first threshold value. For example, this decrease and increase of the hysteretic voltage threshold can be accomplished by opening switch 510 and closing switch 522 in FIG. 5A, and by dynamic current source 508 in FIG. 5A to introduce current in accordance with an inverted sawtooth function like function 570 shown in FIG. 5C. The decreasing and increasing of the hysteretic voltage threshold can occur in about the duration of a lane delay between when the comparing takes place at the secondary side and when the transformer stops switching at the primary side (e.g., $t_{MIN\_OFF} \approx t_{DLY\_LANE}$, as those values are described above).

In some examples, the method 900 of FIG. 9A can continue with the method 950 of FIG. 9B, which describes the transformer burst turn-on process. In FIG. 9B, the output voltage or the signal based thereon can be compared 952 to the hysteretic voltage threshold. Based on this comparison 952, it can be determined 954 that the output voltage or the signal based thereon has decreased below the third threshold value (e.g., lower hysteretic threshold 404 in FIG. 4). Based on the determining 954 the decrease, a hysteresis control signal (e.g., HYST_CTRL(SEC) in FIG. 2 or 3 or HYST_CTRL in FIG. 5A) can be initiated 956 at circuitry at a secondary side of the converter (e.g., secondary-side circuitry 106 in FIG. 1). The hysteresis control signal can direct circuitry at a primary side of the converter (e.g., primary-side circuitry 104 in FIG. 1) to command a transformer (e.g., transformer 108 in FIG. 1) of the converter to start switching (burst on). Based on determining 954 the decrease, the hysteretic voltage threshold can be increased 958 to the first threshold value (e.g., to upper hysteretic threshold 418 in FIG. 4, e.g., by closing hysteretic threshold switch 510 in FIG. 5A).

The circuits and methods described herein introduce a dynamic ramp to adjust the hysteresis reference threshold for burst hysteretic control with enhanced noise immunity. The described circuits and methods leverage the switching waveform profile to inject the dynamic ramp only on the burst off-edge thereby avoiding the need for separate blanking for the burst on-edge. The described circuits and methods use a current source to inject a ramp voltage at the burst off-edge by imposing a dynamic hysteretic current on a resistor that is arranged to create the hysteretic threshold. The dynamic hysteretic current ramps from a nonzero current value (e.g., 4 microamps) to a zero current value. The dynamic ramp allows the hysteretic threshold to widen (in the voltage dimension) by more than twice, and converges to the hysteretic band value after expiry of a minimum off-time. By implementing dynamic hysteresis threshold adjustment for the burst off edge alone, the described circuits and methods provide the described noise immunity benefits without imposing a limitation on the maximum burst frequency.

In this description, the term "based on" means based at least in part on. In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A. Modifications are possible in the described embodiments, and other embodiments are possible, within the scope of the claims.

What is claimed is:

1. An integrated circuit (IC) package comprising:
   primary- and secondary-side circuitry separated by an isolation barrier;
   a transformer arranged across the isolation barrier; and
   a feedback lane across the isolation barrier,
   the secondary-side circuitry comprising:
     a first current source coupled to a resistor;
     a comparator coupled at a first input to a signal based on an output voltage of the secondary-side circuitry, and at a second input to a voltage;
     a control output coupled to an output of the comparator;
     in series with a first switch coupled to and controlled by the output of the comparator output, a second current source coupled to the resistor;
     a timing pulse generator coupled at an input to the control output; and
     in series with a second switch coupled to and controlled by an output of the timing pulse generator, a third current source coupled to the resistor.

2. The IC package of claim 1, wherein the transformer is configured to transfer energy from the primary-side circuitry to the secondary-side circuitry.

3. The IC package of claim 2, wherein the feedback lane is configured to transmit a control signal from the control output in the secondary-side circuitry to the primary-side circuitry.

4. The IC package of claim 3, wherein the first current source is configured to set the voltage to a first threshold.

5. The IC package of claim 4, wherein the second current source is configured to set the voltage to a second threshold larger than the first threshold.

6. The IC package of claim 5, wherein the third current source is configured to, upon closing of the second switch, decrease the voltage from the second threshold to a third threshold and then less rapidly increase the voltage to the first threshold.

7. The IC package of claim 6, wherein a difference between the first threshold and the second threshold is based on a maximum negative noise amplitude of transformer switching noise in the output voltage or the signal based thereon.

8. The IC package of claim 6, wherein the timing pulse generator is configured to generate a pulse of a duration that is based on a latency between a first time when the comparator compares the output voltage or signal based thereon to the voltage to generate the output of the comparator, and a second time when the primary-side circuitry ceases switching the transformer, the latency including a lane delay of the feedback lane.

9. The IC package of claim 1, further comprising:

an inverter coupled at an input to the output of the comparator;

a NOR gate coupled at a first input to an output of the inverter and at a second input to an output of the timing pulse generator;

an S-R latch coupled at a set input to an output of the NOR gate, at a reset input to the output of the inverter, and at an inverting output to the control output; and a D latch coupled at a clock input to the inverting output of the S-R latch and at an output to the input of the timing pulse generator.

10. A method comprising:

setting a voltage threshold in secondary-side circuitry of a DC-to-DC converter to a first threshold value;

determining a comparison an output voltage of the DC-to-DC converter, or a voltage signal based on the output voltage, to the voltage threshold;

in response to the comparison, determining the output voltage or the signal based thereon increased above the first threshold value; and in response to determining the output voltage or the signal based thereon increased above the first threshold value, decreasing the voltage threshold to a second threshold value, then, less rapidly than the decreasing, increasing the voltage threshold to a third threshold value that is less than the first threshold value.

11. The method of claim 10, further comprising, based on the determining the output voltage or the signal based thereon increased above the first threshold value, initiating a control signal at a secondary side of the converter that directs circuitry at a primary side of the converter to command a transformer of the converter to stop switching, the primary and secondary sides separated by an isolation barrier across which the transformer is arranged.

12. The method of claim 11, wherein the decreasing and increasing of the voltage threshold occurs in a duration that is based on a lane delay between when the comparing takes place at the secondary side and when the transformer stops switching at the primary side.

13. The method of claim 12, wherein the comparing is a first comparing, the method further comprising:

a second comparing the output voltage or the signal based thereon to the voltage threshold;

based on the second comparing, determining that the output voltage or the signal based thereon has decreased below the third threshold value; and based on the determining the decrease, increasing the voltage threshold to the first threshold value.

14. The method of claim 13, wherein the control signal is a first control signal, the method further comprising, based on the determining the decrease, initiating a hysteresis control signal at the secondary side that directs the circuitry at the primary side to command the transformer to start switching.

15. The method of claim 10, wherein the decrease and increase of the voltage threshold is performed at least in part by a dynamic function current source configured to produce an inverted sawtooth current function.

16. A system comprising:

a motor; and a three-phase AC bridge coupled to the motor, the AC bridge comprising:

insulated-gate bipolar transistors (IGBTs), each having a gate;

a respective gate driver coupled to the gate of each respective IGBT; and a respective isolated bias supply coupled to each respective gate driver, wherein each isolated bias supply comprises a converter comprising:

a comparator coupled at a first input to an output voltage of the converter, or a signal based on the output voltage, and at a second input to a dynamic reference voltage;

in series with a first switch coupled to and controlled by an output of the comparator, a constant current source;

a timing pulse generator coupled at an input to the output of the comparator; and in series with a second switch coupled to and controlled by an output of the timing pulse generator, a dynamic function current source.

17. The system of claim 16, wherein the dynamic function current source is configured to, upon closing of the second switch, decrease the reference voltage from a first threshold to a second threshold and then less rapidly increase the reference voltage to a third threshold that is less than the first threshold.

18. The system of claim 17, wherein a difference between the third threshold and the second threshold is based on a maximum negative noise amplitude of transformer switching noise in the output voltage or in the signal based thereon.

19. The system of claim 16, wherein the timing pulse generator is configured to generate a pulse of a duration that is based on a latency between a first time when the comparator compares the output voltage or signal based thereon to the reference voltage to generate the output of the comparator, and a second time when a transformer of the converter stops being switched by the primary-side circuitry.

20. The system of claim 19, wherein:

the system is a traction inverter in a vehicle, the converter is a monolithic DC-to-DC converter, and the transformer is an integrated transformer in a semiconductor package of the DC-to-DC converter.

* * * * *